(12) United States Patent
Colston

(10) Patent No.: US 11,324,357 B2
(45) Date of Patent: May 10, 2022

(54) SMOKE GENERATION COOKING SYSTEM AND METHODS

(71) Applicant: Traeger Pellet Grills, LLC, Salt Lake City, UT (US)

(72) Inventor: Michael Colston, Stephensville, MI (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 148 days.

(21) Appl. No.: 16/847,306

(22) Filed: Apr. 13, 2020

(65) Prior Publication Data

US 2020/0237139 A1  Jul. 30, 2020

Related U.S. Application Data

(63) Continuation of application No. 15/114,744, filed as application No. PCT/US2016/039271 on Jun. 24, 2016, now Pat. No. 10,674,866.
(Continued)

(51) Int. Cl.
*A47J 36/00* (2006.01)
*A47J 37/07* (2006.01)
(Continued)

(52) U.S. Cl.
CPC .............. *A47J 36/00* (2013.01); *A23B 4/052* (2013.01); *A23L 5/10* (2016.08); *A47J 37/07* (2013.01);
(Continued)

(58) Field of Classification Search
CPC ... A47J 36/00; A47J 37/07; A23L 5/10; A23B 4/052; F23N 5/265; F24B 1/024;
(Continued)

(56) References Cited

U.S. PATENT DOCUMENTS 3,448,679 A   6/1969  Holka et al.
4,036,995 A   7/1977  Koether et al.
(Continued)

FOREIGN PATENT DOCUMENTS

CA   2776929 A1   11/2013
CN   102625007 A   8/2012
(Continued)

OTHER PUBLICATIONS

Hardwood Pellet Grills. Datasheet [online]. Green Mountain Grills LLC, Apr. 29, 2016. [retrieved Sep. 11, 2018] Retrieved from Internet: <https://greenmountaingrills.com/wp-content/uploads/2016/04/GMG_OperatingApp_Manual_Web.pdf>, 49 pages.
(Continued)

*Primary Examiner* — Khai M Nguyen
(74) *Attorney, Agent, or Firm* — TraskBritt

(57) ABSTRACT

Embodiments are directed to smoking food in an outdoor grill using a customized smoking routine. In one scenario, an electronic controller of an outdoor grill receives an input to initiate smoke generation according to a specified smoke generation pattern, including: adding a specified amount of combustible pellets to a combustion area within the outdoor grill, such that the combustible pellets begin to burn, measuring a current internal temperature of the outdoor grill and, if below a threshold value, adding a specified amount of additional combustible pellets to the combustion area sufficient to raise the temperature to another threshold value, allowing the internal temperature to cool a temperature below the first threshold value and, upon determining that the temperature of the outdoor grill has cooled below the first specified threshold value, adding additional combustible pellets to the combustion area sufficient to raise the temperature to at least the second threshold value.

20 Claims, 8 Drawing Sheets

Related U.S. Application Data

(60) Provisional application No. 62/245,530, filed on Oct. 23, 2015.

(51) Int. Cl.
  *F24B 1/20* (2006.01)
  *F23N 5/26* (2006.01)
  *A23L 5/10* (2016.01)
  *A23B 4/052* (2006.01)
  *F24B 1/02* (2006.01)
  *F24B 1/26* (2006.01)

(52) U.S. Cl.
  CPC .............. *F23N 5/265* (2013.01); *F24B 1/024* (2013.01); *F24B 1/028* (2013.01); *F24B 1/20* (2013.01); *F24B 1/26* (2013.01); *A23V 2002/00* (2013.01); *Y02A 40/928* (2018.01)

(58) Field of Classification Search
  CPC ... F24B 1/028; F24B 1/20; F24B 1/26; Y02A 40/928; Y23V 2002/00
  See application file for complete search history.

(56) References Cited

U.S. PATENT DOCUMENTS

| | | | |
|---|---|---|---|
| 4,409,662 A | 10/1983 | Rao | |
| 4,474,107 A | 10/1984 | Cothran | |
| 4,809,190 A | 2/1989 | Homer et al. | |
| 4,837,414 A | 6/1989 | Edamula | |
| 5,360,965 A | 11/1994 | Ishii et al. | |
| 5,429,110 A | 7/1995 | Burke et al. | |
| 6,223,737 B1 | 5/2001 | Buckner | |
| 6,257,227 B1 | 7/2001 | Harbin | |
| 6,583,991 B1 | 6/2003 | Furuta et al. | |
| 7,168,363 B1 | 1/2007 | Brown | |
| 7,526,539 B1 | 4/2009 | Hsu | |
| D605,216 S | 12/2009 | Nakano | |
| 7,663,502 B2 | 2/2010 | Breed | |
| 7,703,389 B2 | 4/2010 | McLemore et al. | |
| 7,707,606 B2 | 4/2010 | Hofrichter et al. | |
| 7,743,012 B2 | 6/2010 | Chambers et al. | |
| 7,937,484 B2 | 5/2011 | Julia et al. | |
| 8,091,543 B2 | 1/2012 | Baumann et al. | |
| 8,295,851 B2 | 10/2012 | Finnegan et al. | |
| 8,297,271 B2 | 10/2012 | Cedar et al. | |
| 8,539,567 B1 | 9/2013 | Logue et al. | |
| 8,730,038 B2 | 5/2014 | Durian | |
| 8,766,144 B2 | 7/2014 | McLoughlin et al. | |
| 8,855,793 B2 | 10/2014 | Bhargava et al. | |
| 8,880,047 B2 | 11/2014 | Konicek et al. | |
| 8,931,400 B1 | 1/2015 | Allen | |
| 9,149,058 B2 | 10/2015 | Bilet et al. | |
| 9,164,867 B2 | 10/2015 | Ebrom et al. | |
| 9,178,991 B2 | 11/2015 | Finnegan et al. | |
| 9,210,192 B1 | 12/2015 | Kim et al. | |
| 9,414,444 B2 | 8/2016 | Libman et al. | |
| 9,451,031 B2 * | 9/2016 | Graziano ............ | G05D 23/1931 |
| 9,497,572 B2 | 11/2016 | Britt et al. | |
| 9,672,670 B2 | 6/2017 | Menkveld | |
| 9,759,429 B2 | 9/2017 | Tucker | |
| 9,842,442 B2 | 12/2017 | Konicek et al. | |
| 9,928,672 B2 | 3/2018 | Jablokov et al. | |
| 10,158,720 B2 | 12/2018 | Colston | |
| 10,187,494 B2 | 1/2019 | Stewart et al. | |
| 10,194,770 B2 | 2/2019 | Young et al. | |
| 10,213,046 B2 * | 2/2019 | Nonaka ................. | A47J 36/321 |
| 10,218,833 B2 | 2/2019 | Colston | |
| 10,292,531 B1 | 5/2019 | Hancock et al. | |
| 10,388,141 B2 | 8/2019 | Allen, Sr. | |
| 10,395,506 B2 | 8/2019 | Allen, Sr. | |
| 10,444,723 B2 | 10/2019 | Young et al. | |
| 10,628,464 B2 | 4/2020 | Finnegan et al. | |
| 10,674,866 B2 | 6/2020 | Colston | |
| 10,846,313 B2 | 11/2020 | Finnegan et al. | |
| D924,006 S | 7/2021 | Gillespie et al. | |
| D926,056 S | 7/2021 | Lagerstedt et al. | |
| 11,055,937 B2 | 7/2021 | Konicek et al. | |
| 11,058,132 B2 | 7/2021 | Wang | |
| 11,060,735 B2 | 7/2021 | Bhogal et al. | |
| 11,067,284 B2 | 7/2021 | Measom et al. | |
| 11,071,175 B2 | 7/2021 | Schmeski | |
| 11,102,607 B2 | 8/2021 | Konicek et al. | |
| 11,259,140 B2 | 2/2022 | Konicek et al. | |
| 2003/0015188 A1 | 1/2003 | Harbin | |
| 2003/0037681 A1 | 2/2003 | Zhu et al. | |
| 2003/0120972 A1 | 6/2003 | Matsushima et al. | |
| 2004/0182254 A1 | 9/2004 | Gershon | |
| 2005/0034716 A1 | 2/2005 | Harbin | |
| 2005/0203647 A1 | 9/2005 | Landry et al. | |
| 2005/0262226 A1 | 11/2005 | Holloway et al. | |
| 2006/0041655 A1 | 2/2006 | Holloway et al. | |
| 2006/0144384 A1 | 7/2006 | Santagata | |
| 2006/0254432 A1 * | 11/2006 | McLemore ......... | A47J 37/1209 99/448 |
| 2007/0001012 A1 | 1/2007 | Kim et al. | |
| 2007/0012307 A1 | 1/2007 | Wiker et al. | |
| 2007/0056577 A1 | 3/2007 | Chang | |
| 2007/0067431 A1 | 3/2007 | Yoshihara et al. | |
| 2007/0137537 A1 | 6/2007 | Drisdelle et al. | |
| 2007/0180400 A1 | 8/2007 | Zotov et al. | |
| 2007/0221205 A1 | 9/2007 | Landon | |
| 2008/0060632 A1 | 3/2008 | Leverty | |
| 2009/0000493 A1 | 1/2009 | Mosher, II | |
| 2009/0006180 A1 | 1/2009 | Hameen-Anttila | |
| 2010/0012165 A1 | 1/2010 | Bedard | |
| 2010/0037806 A1 | 2/2010 | Duignan et al. | |
| 2010/0132692 A1 | 6/2010 | Shaffer | |
| 2010/0134620 A1 | 6/2010 | Bielstein | |
| 2010/0147823 A1 | 6/2010 | Anderson et al. | |
| 2010/0247721 A1 | 9/2010 | McGhee et al. | |
| 2010/0251973 A1 | 10/2010 | Dongo et al. | |
| 2011/0002677 A1 | 1/2011 | Cochran et al. | |
| 2012/0060819 A1 | 3/2012 | Hunt et al. | |
| 2012/0089835 A1 | 4/2012 | Peckover | |
| 2012/0116820 A1 | 5/2012 | English et al. | |
| 2012/0170247 A1 | 7/2012 | Do | |
| 2012/0204131 A1 | 8/2012 | Hoang et al. | |
| 2012/0210268 A1 | 8/2012 | Hilbrink et al. | |
| 2012/0278454 A1 | 11/2012 | Stewart et al. | |
| 2012/0310416 A1 | 12/2012 | Tepper et al. | |
| 2013/0061765 A1 | 3/2013 | Reinhart | |
| 2013/0171304 A1 | 7/2013 | Huntley | |
| 2013/0188097 A1 | 7/2013 | Smith | |
| 2013/0265159 A1 | 10/2013 | Durian | |
| 2013/0277353 A1 | 10/2013 | Joseph et al. | |
| 2014/0081433 A1 | 3/2014 | Cheong et al. | |
| 2014/0098247 A1 | 4/2014 | Rao et al. | |
| 2014/0121786 A1 | 5/2014 | Chen et al. | |
| 2014/0148969 A1 | 5/2014 | Graziano et al. | |
| 2014/0150698 A1 | 6/2014 | Walker | |
| 2014/0170275 A1 | 6/2014 | Bordin | |
| 2014/0295822 A1 | 10/2014 | Koo et al. | |
| 2014/0326233 A1 | 11/2014 | Traeger | |
| 2014/0365018 A1 | 12/2014 | Kusukame et al. | |
| 2015/0019342 A1 | 1/2015 | Gupta | |
| 2015/0025687 A1 * | 1/2015 | Henderson ............. | A23B 4/052 700/275 |
| 2015/0029342 A1 | 1/2015 | Im et al. | |
| 2015/0056344 A1 | 2/2015 | Luckhardt | |
| 2015/0081086 A1 | 3/2015 | Hallowell et al. | |
| 2015/0134727 A1 | 5/2015 | Lee et al. | |
| 2015/0136113 A1 | 5/2015 | Polter et al. | |
| 2015/0156031 A1 | 6/2015 | Fadell et al. | |
| 2015/0169260 A1 | 6/2015 | McLeod et al. | |
| 2015/0178721 A1 | 6/2015 | Pandiarajan et al. | |
| 2015/0213711 A1 | 7/2015 | Rezvani et al. | |
| 2015/0229713 A1 | 8/2015 | Lu et al. | |
| 2015/0285513 A1 | 10/2015 | Matarazzi et al. | |
| 2015/0304157 A1 | 10/2015 | Kim et al. | |
| 2015/0312398 A1 | 10/2015 | Li | |
| 2015/0330658 A1 | 11/2015 | Filson et al. | |
| 2015/0346952 A1 | 12/2015 | Yang et al. | |
| 2016/0037966 A1 | 2/2016 | Chin et al. | |

(56) References Cited

U.S. PATENT DOCUMENTS

| | | |
|---|---|---|
| 2016/0051078 A1 | 2/2016 | Jenkins et al. |
| 2016/0063013 A1 | 3/2016 | Finnegan et al. |
| 2016/0072638 A1 | 3/2016 | Amer et al. |
| 2016/0080041 A1 | 3/2016 | Schultz et al. |
| 2016/0088049 A1 | 3/2016 | Seed et al. |
| 2016/0147207 A1 | 5/2016 | Park et al. |
| 2016/0191267 A1 | 6/2016 | Zhang et al. |
| 2016/0198885 A1 | 7/2016 | Logan et al. |
| 2016/0218884 A1 | 7/2016 | Ebrom et al. |
| 2016/0255999 A1 | 9/2016 | McAdams et al. |
| 2016/0274611 A1 | 9/2016 | Amer et al. |
| 2016/0327263 A1 | 11/2016 | Traeger |
| 2016/0335874 A1 | 11/2016 | Allen, Sr. |
| 2016/0371961 A1 | 12/2016 | Narang et al. |
| 2017/0020324 A1 | 1/2017 | Young et al. |
| 2017/0025861 A1 | 1/2017 | Lee et al. |
| 2017/0164783 A1 | 6/2017 | Sauerwein et al. |
| 2017/0176019 A1 | 6/2017 | Bhogal et al. |
| 2017/0243040 A1 | 8/2017 | Burkhart et al. |
| 2017/0289257 A1 | 10/2017 | Colston |
| 2017/0289336 A1 | 10/2017 | Colston |
| 2018/0125296 A1 | 5/2018 | Gafford |
| 2018/0125396 A1 | 5/2018 | Lansdorp et al. |
| 2018/0220099 A1 | 8/2018 | Li |
| 2018/0239316 A1 | 8/2018 | Toscano et al. |
| 2018/0310361 A1 | 10/2018 | Sorenson et al. |
| 2019/0282032 A1 | 9/2019 | Colston et al. |
| 2019/0289118 A1 | 9/2019 | Colston |
| 2019/0289119 A1 | 9/2019 | Colston |
| 2019/0289121 A1 | 9/2019 | Colston |
| 2019/0290064 A1 | 9/2019 | Colston et al. |
| 2019/0293295 A1 | 9/2019 | Colston et al. |
| 2020/0103120 A1 | 4/2020 | Bhogal et al. |
| 2020/0214503 A1 | 7/2020 | Altenritter |
| 2021/0026876 A1 | 1/2021 | Finnegan et al. |
| 2021/0207812 A1 | 7/2021 | Bhogal et al. |
| 2021/0215344 A1 | 7/2021 | Eckhardt et al. |
| 2022/0050861 A1 | 2/2022 | Finnegan et al. |

FOREIGN PATENT DOCUMENTS

| | | |
|---|---|---|
| CN | 202392848 U | 8/2012 |
| CN | 103138980 A | 6/2013 |
| CN | 203914599 U | 11/2014 |
| CN | 104539492 A | 4/2015 |
| CN | 204270170 U | 4/2015 |
| CN | 104615456 A | 5/2015 |
| CN | 204480081 U | 7/2015 |
| CN | 107251507 A | 10/2017 |
| DE | 102008043722 A1 | 5/2010 |
| DE | 102012204229 | 9/2013 |
| EP | 0298858 A1 | 1/1989 |
| EP | 0899512 | 3/1999 |
| JP | 2003-172578 A | 6/2003 |
| JP | 2004-229266 A | 8/2004 |
| JP | 2005-341080 A | 8/2005 |
| JP | 2006-163669 A | 6/2006 |
| JP | 2006-201994 A | 8/2006 |
| JP | 2007-004579 A | 1/2007 |
| JP | 2007-053530 A | 3/2007 |
| JP | 2010-519492 A | 6/2010 |
| JP | 2012-032949 A | 2/2012 |
| JP | 2012-141658 A | 7/2012 |
| JP | 2015-017711 A | 1/2015 |
| KR | 10-2002-0036478 A | 5/2002 |
| KR | 10-2014-0008927 | 1/2014 |
| KR | 10-1457087 B1 | 10/2014 |
| KR | 10-2014-0135318 A | 11/2014 |
| KR | 2014-0135318 A | 11/2014 |
| KR | 10-1534514 B1 | 7/2015 |
| WO | 2007/070873 A2 | 6/2007 |
| WO | 2012/171242 A1 | 12/2012 |
| WO | 2014/086487 A1 | 6/2014 |
| WO | 2015/137740 A1 | 9/2015 |
| WO | 2017/069799 A1 | 4/2017 |
| WO | 2017/069801 A1 | 4/2017 |
| WO | 2017/069813 A1 | 4/2017 |
| WO | 2020/154022 A1 | 7/2020 |
| WO | 2020/227522 A1 | 11/2020 |

OTHER PUBLICATIONS

International Preliminary Reporton Patentability received for PCT Patent Application No. PCT/US2016/024737, dated May 3, 2018, 10 pages.

International Preliminary Reporton Patentability received for PCT Patent Application No. PCT/US2016/026736, dated May 3, 2018, 11 pages.

International Preliminary Reporton Patentability received for PCT Patent Application No. PCT/US2016/039271, dated May 3, 2018, 12 pages.

International Search Report for application No. PCT/US2016/026736 dated Jul. 8, 2016.

International Search Report for application No. PCT/US2016/039271 dated Sep. 23, 2016.

International Search Report for International Application No. PCT/US2016/024737, dated Jul. 8, 2016, 3 pages.

International Written Opinion for International Application No. PCT/US2016/024737, dated Jul. 8, 2016, 8 pages.

International Written Opinion for International Application No. PCT/US2016/026736, dated Jul. 8, 2016, 9 pages.

International Written Opinion for International Application No. PCT/US2016/039271, dated Sep. 23, 2016, 10 pages.

Jim Mahoney: "CyberCook—CyberQ WiFi Software : 2015 Blog", Blog Grillin' & Smoking BBQ, Feb. 1, 2015 (Feb. 1, 2015), pp. 1-26, XP055478026, us Retrieved from the Internet: URL:http://www.grillinsmokin.net/blogsall/blog 2015/files/cybercook-cyber -wifi -soft ware.php [retrieved on May 24, 2018].

Lynx Smart Grill User Manual (archived May 21, 2015) 48 pages.

MatthewC: "[Review] "Daniel Boone" Green Mountain Grill with WiFi—NZ TechBlog", May 9, 2015 (May 9, 2015), XP055577976 Retrieved from the Internet: URL:http://nztechblog.net/2015/05/09/review-daniel-boone-green-mountain-grill-with-wifi/[retrieved on Apr. 5, 2019], 17 pages.

Michael E. Porter & James E. Heppelmann, How Smart, Connected Products Are Transforming Competition, Harv. Bus. Rev. 65-88 (Nov. 2014), 28 pages.

Moataz Soliman el al., Smart Home: Integrating Internet of Things with Web Services and Cloud Computing, 2013 IEEE Int'l Conf. on Cloud Computing Tech. & Sci. 317-320 (2013).

Monitor All Aspects of Grill Performance From Your Smart Phone [online] Saber Grills, 2015 [retrieved on Jul. 6, 2018]. Retrieved from the Internet: <URL:https://sabergrilss.com/Edge/index.html>, 1 page.

Murata Manufacturing Co., Ltd. "WiFi Module Data Sheet, Broadcom BCM43362 WiFi + ST Micro STM32F405 MCU, Tenative P/N: LBWA1ZV1CD-716" http://electricimp.com/docs/attachments/hardware/datasheets/imp003_LBWA1Z-V1CD_060314.pdf Feb. 26, 2018, 24 pages.

Non-Final Office Action for U.S. Appl. No. 15/511,319 dated Dec. 20, 2018, 63 pages.

Non-Final Office Action for U.S. Appl. No. 15/114,744 dated Feb. 19, 2019, 67 pages.

Non-Final Office Action for U.S. Appl. No. 15/510,996 dated May 11, 2018, 45 pages.

Non-Final Office Action for U.S. Appl. No. 16/193,295 dated Dec. 26, 2018, 31 pages.

Notice of Allowance for U.S. Appl. No. 15/510,996, dated Aug. 29, 2018, 17 pages.

Notice of Allowance for U.S. Appl. No. 15/954,199 dated Jul. 5, 2018, 23 pages.

Office Action dated Jul. 18, 2018, Norwegian IP Office, App No. NO 20170757, 2 pages.

Patent Owner's Preliminary Responce, Paper 10, filed on Apr. 18, 2019, by the patentowner, in the matter of GMG Products LLC v. Traeger Pellet Grills, LLC, PGR Trial No. PGR2019-00024 regarding U.S. Pat. No. 10,158,720, 47 pages.

(56) References Cited

OTHER PUBLICATIONS

Patent Owner's Preliminary Responce, Paper 7, filed on Jun. 5, 2019, by the patentowner, in the matter of *GMG Products LLC* v. *Traeger Pellet Grills, LLC*, PGR Trial No. PGR2019-00034 regarding U.S. Pat. No. 10,218,833, Mailed on Mar. 5, 2019, 03 pages.
Patent Owner's Sur-Reply in Support of Patent Owner's Preliminary Responce, Paper 15, filed on May 24, 2019, by the patentowner, in the matter of *GMG Products LLC* v. *Traeger Pellet Grills, LLC*, PGR Trial No. PGR2019-00024 regarding U.S. Pat. No. 10,158,720, 07 pages.
Petition by Green Mountain Grills for Post Grant Review of U.S. Pat. No. 10,158,720, filed on Dec. 18, 2018, PGR Trial No. PGR2019-00024, 111 pages.
Petition by Green Mountain Grills for Post Grant Review of U.S. Pat. No. 10,158,720, filed on Mar. 15, 2019, PGR Trial No. PGR2019-00036, 110 pages.
Petitioner's Reply to Patent Owners Preliminary Responce, Paper 14, filed on May 17, 2019, by the petitioner, in the matter of *GMG Products LLC* v. *Traeger Pellet Grills, LLC*, PGR Trial No. PGR2019-00024 regarding U.S. Pat. No. 10,158,720, 07 pages.
Pew Research Center, U.S. Smartphone Use in 2015 at 36 (Apr. 1, 2015), 60 pages.
Post Grant Review Petition of U.S. Pat. No. 10,218,833, Paper 3, filed on Feb. 26, 2019, by the petitioner, in the matter of *GMG Products LLC* v. *Traeger Pellet Grills, LLC*, PGR Trial No. PGR2019-00034 regarding U.S. Pat. No. 10,218,833, 109 pages.
Procecution History for U.S. Pat. No. 10,158,720 (Part 1), Exhibits 2001, filed on Apr. 18, 2019, by the patent owner, in the matter of *GMG Products LLC* v. *Traeger Pellet Grills, LLC*, PGR Trial No. PGR2019-00024 regarding U.S. Pat. No. 10,158,720 ,350 pages.
Procecution History for U.S. Pat. No. 10,158,720 (Part 2), Exhibits 2001, filed on Apr. 18, 2019, in the matter of *GMG Products LLC* v. *Traeger Pellet Grills, LLC*, PGR Trial No. PGR2019-00024 regarding U.S. Pat. No. 10,158,720, by the patent owner, 435 pages.
Quirky Pivot Power Genius, retrieved from http://www.quirky.com/shop/633-pivot-power-genius-power-control-from-your- -smartphone on Feb. 26, 2018, 6 pages.
Quirky Spotter, retrieved from http://www.quirky.com/shop/609-spotter-multi-prupose-sensor on Feb. 26, 2018, 4 pages.
Quirky, "Shop for products invented by real people" retrieved from http://www.quirky.com on Feb. 26, 2018, 1 page.
RFC 791, Internet Protocol, DARPA Internet Program Protocol Specification (Sep. 1981) 50 pages.
Rus Shuler, White Paper, "How Does the Internet Work?" http://www.theshulers.com/whitepapers/internet_whitepaper/index.html#route (2005) 11 pages.
Screen Captures and Transcript from YouTube video clip entitled "Green Mountain Grills—First Ever AC/DC Powered—Davy Crockett Promo Video", 5 pages, uploaded on Jul. 31, 2014 by user "Green Mountain Grills". [retrieved Sep. 11, 2018] Retrieved from Internet: <https://www.youtube.com/watch?v=R5huHfS5cHA&list=RDQMGcmWL20hfzw&inde- x=17>.
Screen Captures from YouTube video clip entitled "Network Setup on a Char-Broil Electric Smoker with Smartchef Technology", 5 pages, uploaded on Nov. 18, 2018 by user "Char-Broil Grills". Retrieved from Internet: <https://www.youtube.com/watch?v=bEt9_bLasas>.
Screen captures from YouTube video Clip entitled "Saber Edge Grill", 3 pages, uploaded on Apr. 5, 2015 by user "Max Good". Retrieved from Internet: <https://www.youtube.com/watch?v=mLZobNHMXbo>.
SmartThings GE Light & Appliance Plug- and -ControlPower Outlet, retireved from https://shop.smartthings.com#!/products/ge-z-wave-wireless-lighting-- control-lamp-module on Feb. 26, 2018, 14 pages.
SmartThings Hub, retireved from https://shop.smartthings.com/#!/products/smarthings-hub on Feb. 26, 2018, 16 pages.
SmartThings Product, retrieved from http://www.smartthings.com/prduct/on Feb. 26, 2018, 9 pages.

SmartThings, "Easy & Affordable Smart Home Automation" retrieved from http://www.smartthings.com on Feb. 26, 2018, 5 pages.
Tasarra-Twigg, Noemi. 'The Saber EDGE Smart Grill: Hi-tech BBQ', in Apple Gazette [online]. Posted Mar. 17, 2015 [retrieved on Jul. 6, 2018]. Retrieved from the Internet: <URL:http://www.applegazette.com/accessories-2/the-saber-edge-smart-grill-hi-tech-bbq/>, 7 pages.
The Statistics Portal, Cumulative Number of Apps Downloaded from the Apple App Store from Jul. 2008 to Jun. 2017 (in billions) (2019), 4 pages.
Ttdadmin, 'DADO & Partners Take Home Top Awards at Home Electronics Shows', in DADO [online]. Posted Mar. 16, 2015 [retrieved on Jul. 6, 2018]. Retrieved from the Internet: <URL:http://dadolabs.com/march2015awards/>, 4 pages.
Ttdadmin, 'Product Showcase: Char-Broil(Registered) Simple Smoker with SmartChef(Trademark) Technology', in DADO [online]. Posted Mar. 25, 2016 [retrieved on Jul. 6, 2018]. Retrieved from the Internet: <URL:http://dadolabs.com/charbroil-simple-smoker/>, 12 Pages.
Baum, White Paper, Texas Instruments, A Link to the Internet of Things: IoT made easy with SimpleLink Wi-Fi solutions, Jul. 14, pp. 7-11 (12 pages).
MAK Grills Mobile Web Client Screenshot, MG_00000191, (2013) 1 page.
MAK Grills, MAK Grills Mobile—Installation and Setup Video, available at: https://www.youtube.com/watch?v=hitrrKyawME, May 22, 2013. Document includes one screenshot image from video. CD including video file sent to Examiner by US Postal Service with this PTO/SB/08 form.
MAK Grills, MAK Grills Mobile Operating Instructions—4 Star Grill Owners, MG_00000183-87, (2013) 5 pages.
Texas Instruments, CC3200 SimpleLink Wi-Fi and Internet-of-Things Solution, a Single Chip Wireless MCU: Programmer's Guide, Jul. 2013—Revised Jun. 2014, 68 pages.
Texas Instruments, CC3200 Software Development Kit (SDK), Service Pack, and Add-Ons, available at: https://www.ti.com/tool/download/CC3200SDK/1.1.0, Release Date: Feb. 24, 2015, 1 page.
Texas Instruments, SimpleLink Wi-Fi CC3200 LaunchPad Out of Box Experience Video, available at: https://training.ti.com/simplelink-wi-fi-cc3200- launchpad-out-box-experience, Nov. 8, 2015. Document includes one screenshot image from video. CD including video file sent to Examiner by US Postal Service with this PTO/SB/08 form.
"Char-Broil Operations Guide English French", 15.125115 VESCONN 2015 Grilling Guide ENG.indd, Jan. 19, 2016, pp. 1-20 (43 pages total).
"Interview with the developer of our WiFi controller." [online]. Posted Mar. 29, 2015. Retrieved Nov. 27, 2018. <https://web.archive.org/web/20150329163126/blog.greenmountaingrills.com/interview-david-developer-new-wifi-controller>, 3 pages.
"SmartChef Grill Guide English Spanish", 17.125395 Smart Chef Grill.indd, Sep. 27, 2016. pp. 1-16 (32 pages total).
U.S. Pat. No. 10,218,833 Patent File History, Dec. 21, 2018 RCE and IDS, Exhibits 1040, filed on Feb. 26, 2019, by the petitioner, 11 pages.
U.S. Pat. No. 10,218,833 Patent File History, Dec. 6, 2018 Issue Notification, Exhibits 1044, filed on Feb. 26, 2019, by the petitioner, 01 page.
U.S. Pat. No. 10,218,833 Patent File History, Jan. 14, 2019 Notice of Allowability, Exhibits 1041, filed on Feb. 26, 2019, by the petitioner, in the matter of *GMG Products LLC* v. *Traeger Pellet Grills, LLC*, PGR Trial No. PGR2019-00034 regarding U.S. Pat. No. 10,218,833, 2 pages.
U.S. Pat. No. 10,218,833 Patent File History, Jul. 18, 2018 Amendments, Exhibits 1037, in the matter of *GMG Products LLC* v. *Traeger Pellet Grills, LLC*, PGR Trial No. PGR2019-00034 regarding U.S. Pat. No. 10,218,833, filed on Feb. 26, 2019, by the petitioner, 11 pages.
U.S. Pat. No. 10,218,833 Patent File History, Mar. 13, 2017 Preliminary Amended Claims, Exhibits 1035, in the matter of *GMG Products LLC* v. *Traeger Pellet Grills, LLC*, PGR Trial No. PGR2019-00034 regarding U.S. Pat. No. 10,218,833, filed on Feb. 26, 2019, by the petitioner, 10 pages.

(56) References Cited

OTHER PUBLICATIONS

U.S. Pat. No. 10,218,833 Patent File History, May 11, 2018, Non-Final Rejection, EXHIBITS 1036, in the matter of *GMG Products LLC* v. *Traeger Pellet Grills, LLC*, PGR Trial No. PGR2019-00034 regarding U.S. Pat. No. 10,218,833, filed on Feb. 26, 2019, by the petitioner, 18 pages.
U.S. Pat. No. 10,218,833 Patent File History, Oct. 16, 2018 Response to Amendments Under Rule 312, Exhibits 1039, in the matter of *GMG Products LLC* v. *Traeger Pellet Grills, LLC*, PGR Trial No. PGR2019-00034 regarding U.S. Pat. No. 10,218,833, filed on Feb. 26, 2019, by the petitioner, 02 pages.
U.S. Pat. No. 10,218,833 Patent File History, Sep. 27, 2018 Amendments, Exhibits 1038, in the matter of *GMG Products LLC* v. *Traeger Pellet Grills, LLC*, PGR Trial No. PGR2019-00034 regarding U.S. Pat. No. 10,218,833, filed on Feb. 26, 2019, by the petitioner, 12 pages.
Affidavit of Christopher Butler, Internet Archives Affidavit (Feb. 8, 2019) 6 pages.
Astrelgroup: "HOTTOH: Electronic solutions for the biomass heating". Mar. 15, 2016 (Mar. 15, 2016), pp. 1-36, Retrieved from the Internet: URL: http://www.astrelgroup.com/wp-content/uploads/2016/06/80H000011R1.1_Hotto-h-Catalogue_EN_20160315.pdf [retrieved on Mar. 9, 2017].
Bennett6. "Server Mode is Here". Pelletheads [online]. Posted on Jul. 4, 2016, 11:58:19 AM. [retrieved Sep. 11, 2018] Retrieved from Internet: <http://pelletheads.com/index.php?topic=37421.0>, 16 pages.
Charles M. Kozierok, The TCP/IP Guide, The Advantages (Benefits) of Networking (vers. 3.0, Sep. 20, 2005) 3 pages.
Craig Goldwyn, "The Zen of Wood" May 1, 2008, <www.amazingribs.com>, accessed online at <web.archive.org/web/20080501010952/http://www.amazingribs.com/tips_and_technique/zen_of_wood.html>.
Crock-Pot, Coming Soon! Crockpot.RTM. Smart Slow Cooker enabled with WeMo.TM. retrieved from http://www.crock-pot.com/slow-cookers/coming-soon%21-crock-pot%C2%AE-smar-t-slow-cooker-enabled-with-wemo%E2%84%A2/SCCPWM600-V1.html on Feb. 26, 2018, 8 pages.
Custom Thermoelectric, "Power Generator (Seebeck) Module Installation," 2010, pp. 1-6.
Dankirk. "Got My WiFi Upgrade". Pelletheads [online]. Posted on Aug. 22, 2014, 10:31:42 PM. [retrieved Sep. 11, 2018) Retrieved from Internet: <http://pelletheads.com/index php?topic=30181.0>, 31 pages.
Daugherty, Trevor. With summer approaching, SABER introduces the iPhone connected EDGE smart grill', in 9TO5Toys [online]. Posted Mar. 16, 2015 [retrieved Jul. 6, 2018]. Retrieved from the Internet: <URL:https://9to5toys.com/2015/03/16/sbaer-edge-iphone-connected-grill/>, 12 pages.
Davy Crockett Model. Datasheet [online]. Green Mountain Grills LLC, May 28, 2015. [retrieved Sep. 11, 2018] Retrieved from Internet: <https://www.manualslib.com/manual/863329/Green-Mountain-Grills-Davy-Crockett.html>, 2 pages.
Declaration of Henry Houh, Ph.D., Exhibits 1002, filed on Dec. 18, 2018, by the petitioner, in the matter of *GMG Products LLC* v. *Traeger Pellet Grills, LLC*, PGR Trial No. PGR2019-00024 regarding U.S. Pat. No. 10,158,720, 149 pages.
Declaration of Henry Houh, Ph.D., Exhibits 1002, filed on Feb. 26, 2019, by the petitioner, in the matter of *GMG Products LLC* v. *Traeger Pellet Grills, LLC*, PGR Trial No. PGR2019-00034 regarding U.S. Pat. No. 10,218,833, dated Feb. 26, 2019, 159 pages.
Declaration of Henry Houh, Ph.D., Exhibits 1102, filed on Mar. 15, 2019, by the petitioner, in the matter of *GMG Products LLC* v. *Traeger Pellet Grills, LLC*, PGR Trial No. PGR2019-00036 regarding U.S. Pat. No. 10,158,720, 194 pages.
Don Clark, The Race to Build Command Centers for Smart Homes, Wall Street J. (Jan. 4, 2015) 3 pages.
Electric Imp Lockitron, retrieved from http://electricimo.com/productgallery/lockitron/ on Feb. 26, 2018, 2 pages.
Electric Imp, "Connectivity Made Simple" retrieved from http://electricimp.com/ on Feb. 26, 2018, 2 pages.
Electric Imp, "The Interactive imp: how to manage communication between app, agent and device" retrieved from http://electricimp.com/docs/resources/interactive/ on Feb. 26, 2018, 11 pages.
Electric Imp, Inc. "specification: imp001 version 20140226" http://www.electricimp.com/ (2014) 14 pages.
Electric Imp, Inc. "specification: imp002 version 20140226" http://www.electricimp.com/ (2014) 18 pages.
Electric Imp. "How to run an imp offline: Making- and breaking-Internet connections" retrieved from http://eletricimp.com/docs/resources/offline/ on Feb. 26, 2018, 9 pages.
Emerson, Sensi Wi-Fi Programmable Thermostat Installation Guide (Sep. 2015) 13 pages.
Eugene Gorelik, Cloud Computing Models, MIT Working Paper, CISL #2013-01 (Jan. 2013) 89 pages.
European Search Report and Search Opinion Received for EP Application No. 16857913.4, dated Mar. 26, 2019, 11 pages.
European Search Report and Search Opinion Received for EP Application No. 16857912.6, dated May 6, 2019, 6 pages.
European Search Report and Search Opinion Received for EP Application No. 16857921.7, dated Apr. 30, 2019, 10 pages.
Facebook post entitled "Green Mountain Grills—Corporate shared a photo." 4 pages, posted on Jul. 29, 2014 by user "Green Mountain Grills—Corporate". [retrieved Sep. 11, 2018] Retrieved from Internet: <https://www.facebook.com/GreenMountainGrills/posts/826618620691226>.
Fielding et al., Standards Track: RFC 7230, Hypertext Transfer Protocol (HTTP/1.1): Message Syntax and Routing, Internet Engineering Task Force (IETF) (Jun. 2014) 89 pages.
File History for U.S. Pat. No. 10,158,720, Track One Request (Apr. 16, 2018), 2 pages.
File History for U.S. Pat. No. 10,218,833 Part 1, Exhibits 2001, in the matter of *GMG Products LLC* v. *Traeger Pellet Grills, LLC*, PGR Trial No. PGR2019-00024 regarding U.S. Pat. No. 10,158,720 filed on Jun. 5, 2019, by the patent owner, 363 pages.
File History for U.S. Pat. No. 10,218,833 Part 2, Exhibits 2001, in the matter of *GMG Products LLC* v. *Traeger Pellet Grills, LLC*, PGR Trial No. PGR2019-00024 regarding U.S. Pat. No. 10,158,720, filed on Jun. 5, 2019, by the patent owner, 541 pages.
File History for U.S. Pat. No. 10,158,720 Track One Grant (May 31, 2018), 4 pages.
Francis daCosta, Rethinking the Internet of Things: A Scalable Approach to Connecting Everything ch. 1 (2013) 185 pages.
Get Gookin'—Our Favorite Grills', in Modern in Denver [online]. Posted Jun. 1, 2015 [retrieved on Jul. 6, 2018]. Retrieved from the Internet: <URL:https://www.modernindenver.com/2015/06/grills/>, 8 pages.
GMG App User Guide. Datasheet [online]. Green Mountain Grills LLC, Jul. 28, 2014. [retrieved Sep. 11, 2018) Retreived from Internet: <https://greenmountaingrills.com/wp-content/uploads/2014/08/GMG-Singles-.pdf>, 20 pages.
GMG Product Brochure Publication (GMG Publication), https://web.archive.org/web/20101216012026/http:/www.greenmountaingrills.com:80/grills.html, retrieved Jan. 29, 2019, 3 pages.
GMG Products LLC, "Dealer Price List, Aug. 1, 2015". 1 page.
Good, Max. 'Saber Edge Grill Review', in Amazing Ribs [online]. [retrieved on Jul. 6, 2018]. Retrieved from the Internet: <URLhttps://amazingribs.com/grill/saber-edge-grill-review>, 9 pages.
Green Mountain Grills Announces Server Mode Is Now Available. Press Release [online]. Green Mountain Grills LLC, Dec. 5, 2017. [retrieved Sep. 11, 2018] Retrieved from Internet: <https://www.prnewswire.com/news-releases/green-mountain-grills-announces-server-mode-is-now-available-300567051.html>, 2 pages.
Green Mountain Pellet Grill—Jim Bowie Model—Daniel Boone Model. Datasheet [online]. Green Mountain Grills LLC, Oct. 7, 2010. Retreived from Internet: <https://www.bbqgrills.co.nz/wp-content/uploads/2015/06/preOctober2010Manual.pdf>.
Ttdadmin, 'Products', in DADO [online], [retrieved on Jul. 6, 2018] Retrieved from the Internet: <URL:http://dadolabs.com/category/products/>, 5 pages.
Ttdadmin, 'Saber, Char-Broil and DADO Make Outdoor Cooking Smart at CES', in DADO [online]. Posted Jan. 7, 2015 [retrieved on Jul. 6, 2018]. Retrieved from the Internet: <URL:http://dadolabs.com/saberandcbatces/>, 5 pages.

(56) References Cited

OTHER PUBLICATIONS

Ttdadmin, 'Smarter Cookouts With IoT-Enabled Grills', in DADO [online]. Posted May 7, 2015 [retrieved on Jul. 6, 2018] Retrieved from the Internet: <URL:http://dadolabs.com/smartercookoutswithiot/>, 5 pages.
Urban Griller. "GMG Server mode available". Smoke Fire and Food [online]. Posted on Jul. 6, 2016. [retrieved Sep. 11, 2018] Retrieved from Internet: <https://smokefireandfood.com/forum/index.php?thread/1632-gmg-server-mode-available/&s=91c16f3112ff4c847e243b766dee6abeb9553a5b>, 5 pages.
Welcome to Life Lived on the Edge', in Edge: A Smarter Barbecue [online]. Posted Sep. 8, 2015 [retrieved on Jul. 8, 2018], Retrieved from the Internet: <URL:https://www.sabergrills.com/Edge/features.html>, 4 pages.
Chef Tips: "Green Mountain Pellet Grill—Smoker Review & FAQ", YouTube, May 19, 2013 (May 19, 2013), pp. 1-1, XP054980243, Retrieved from the Internet: URL:https://www.youtube.com/watch?v=fh_4TlnOHMw [retrieved on Feb. 19, 2020].
Chinese First Office Action for Chinese Application No. 201680021714.8, dated Aug. 4, 2020, 35 pages with translation.
Electric Imp Product, retrieved from http://electricimp.com/product/ on Jun. 19, 2014, 3 pages.
European Communication pursuant to Article 94(3) EPC for European Application No. 16857921.7, dated Mar. 6, 2020, 6 pages.
IL Office Action dated Dec. 30, 2019 for IL Application No. 247665.
U.S. Appl. No. 17/571,008, filed Jan. 7, 2022, titled "Routing Communications By Scanning Visible Codes", to Konicek et al., 66 pages.

\* cited by examiner

SMOKE GENERATION COOKING SYSTEM AND METHODS

CROSS-REFERENCE TO RELATED APPLICATIONS

This application is a continuation of U.S. patent application Ser. No. 15/114,744, filed Jul. 27, 2016, now U.S. Pat. No. 10,674,866, issued Jun. 9, 2020, which is a national phase entry under 35 U.S.C. § 371 of International Patent Application No. PCT/US2016/039271, filed on Jun. 24, 2016, designating the United States of America and published as International Patent Publication WO 2017/069813 on Apr. 27, 2017, which claims the benefit under Article 8 of the Patent Cooperation Treaty to U.S. Provisional Application No. 62/245,530, filed Oct. 23, 2015, the disclosure of each of which is hereby incorporated herein in its entirety by this reference.

BACKGROUND

Outdoor appliances have long been used to prepare food and perform other tasks. For example, outdoor appliances such as grills and smokers are often used to prepare meats, vegetables, fruits, and other types of food. These grills and smokers are typically operated using manual controls that are integrated into the frame of grill or smoker. For example, many such outdoor appliances have an ignition button that, when pressed, generates a spark near a gas outlet on a burner. The spark ignites the gas and the burner begins to create heat. The amount of heat is generally controlled using a dial or nob that allows more or less gas to be introduced at the burner.

In the case of a smoker, a combustion area or "firepot" may exist into which combustible wood pellets are introduced. These combustible wood pellets may be introduced at a given rate according to a timer. By introducing the pellets at a specified rate, the smoker may be able to maintain a specified temperature. For example, a user may wish to smoke brisket at a specified temperature. The user may select the specified temperature while at the smoker. Typically, outdoor appliances such as grills and smokers have some type of manual or electronic controls. The user can use these controls to specify which temperature is to be maintained by the smoker, and may further be able to set a timer to remind the user to turn or remove the food from the smoker.

The controls found on these outdoor appliances, however, are lacking in features, and only cover basic functionality. Indeed, as mentioned, users may be able to ignite the appliance using an ignition button, and may be able to specify a certain temperature which is to be maintained by the appliance. Users may also be able to set a timer to remind them when their food is finished cooking. These controls, however, do not allow for modifications or custom cooking/smoking cycles, and generally do not allow users the type or amount of control they wish to have over their outdoor appliance. Moreover, conventional appliances tend to have limited or no controls that enable cooking appliances to change in response to certain triggers such as cooking profiles based on flavor, temperature, amount of smoke used in cooking, or the like.

Accordingly, there are a number of problems in the art that can be addressed.

BRIEF SUMMARY

Embodiments described herein are directed to smoking food in an outdoor grill using a customized grilling and/or smoking routine. In particular, embodiments of the present invention enable a user to implement automatic controls of an outdoor cooking apparatus from a remote location, in particular remote control of grilling and smoke-generating apparatus used for outdoor barbecues. Embodiments of the present invention can, for example, enable a user to assign a particular cooking profile, such as a flavor, temperature, or other profile, to a food item. The user can then remotely operate an outdoor cooking apparatus, such as a barbecue grill and/or barbecue smoker, so that the cooking apparatus automatically and/or dynamically adjusts several different components of the cooking apparatus in response to certain triggers (e.g., recipe steps) contained in the assigned cooking profile. In at least some embodiments of the present invention, therefore, a user can cook a food item in a wide variety of circumstances (e.g., time, food and/or outdoor temperature, amount of smoke, intended flavor) and still maintain a precise-end result.

For example, in one embodiment, an electronic controller of an outdoor grill (and/or smoker) receives an input from a remote computer system indicating that the outdoor grill is to initiate smoke generation according to a cooking profile based on a specified smoke generation pattern. The electronic controller of the outdoor grill performs the following according to the specified smoke generation pattern: adds a specified amount of combustible pellets to a combustion area within the outdoor grill, such that the combustible pellets begin to burn, measures a current internal temperature of the outdoor grill.

Upon determining that the current internal temperature is below a first specified threshold value of the cooking profile, the electronic controller of the outdoor grill adds a specified amount of additional combustible pellets to the combustion area sufficient to raise the temperature to a second specified threshold value. The electronic controller of the outdoor grill further allows the internal temperature of the outdoor grill to cool a temperature below the first specified threshold value and, upon determining that the temperature of the outdoor grill has cooled below the first specified threshold value, adjusts one or more components of outdoor grill to compensate, such as by adding a second specified amount of additional combustible pellets to the combustion area, adjusting an internal fan, or the like, sufficient to raise the temperature to at least the second threshold value.

In another embodiment, an electronically-controlled outdoor grill receives an input from a remote computer system indicating that the outdoor grill is to initiate smoke generation according to a specified cooking profile with a customized smoke generation pattern, where the customized smoke generation pattern was created by a user. The electronically-controlled outdoor grill analyzes the specified smoke generation pattern to determine, for example, how many (or at what speed) wood pellets are to be added to the combustion area by a hopper, to further determine when the wood pellets are to be added to a combustion area, and/or to determine one or more other factors, such as operation of an internal fan, or operating the fan at a particular speed.

The electronically-controlled outdoor grill then measures a current internal temperature of the outdoor grill and, upon determining the current internal temperature of the outdoor grill, initiates a set of appropriate actions, such as by initiating the customized smoking pattern. As part of the customized smoking pattern, the determined amount of wood pellets is added to the combustion area by the hopper at the determined time, adjusted according to the current internal temperature of the outdoor grill.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
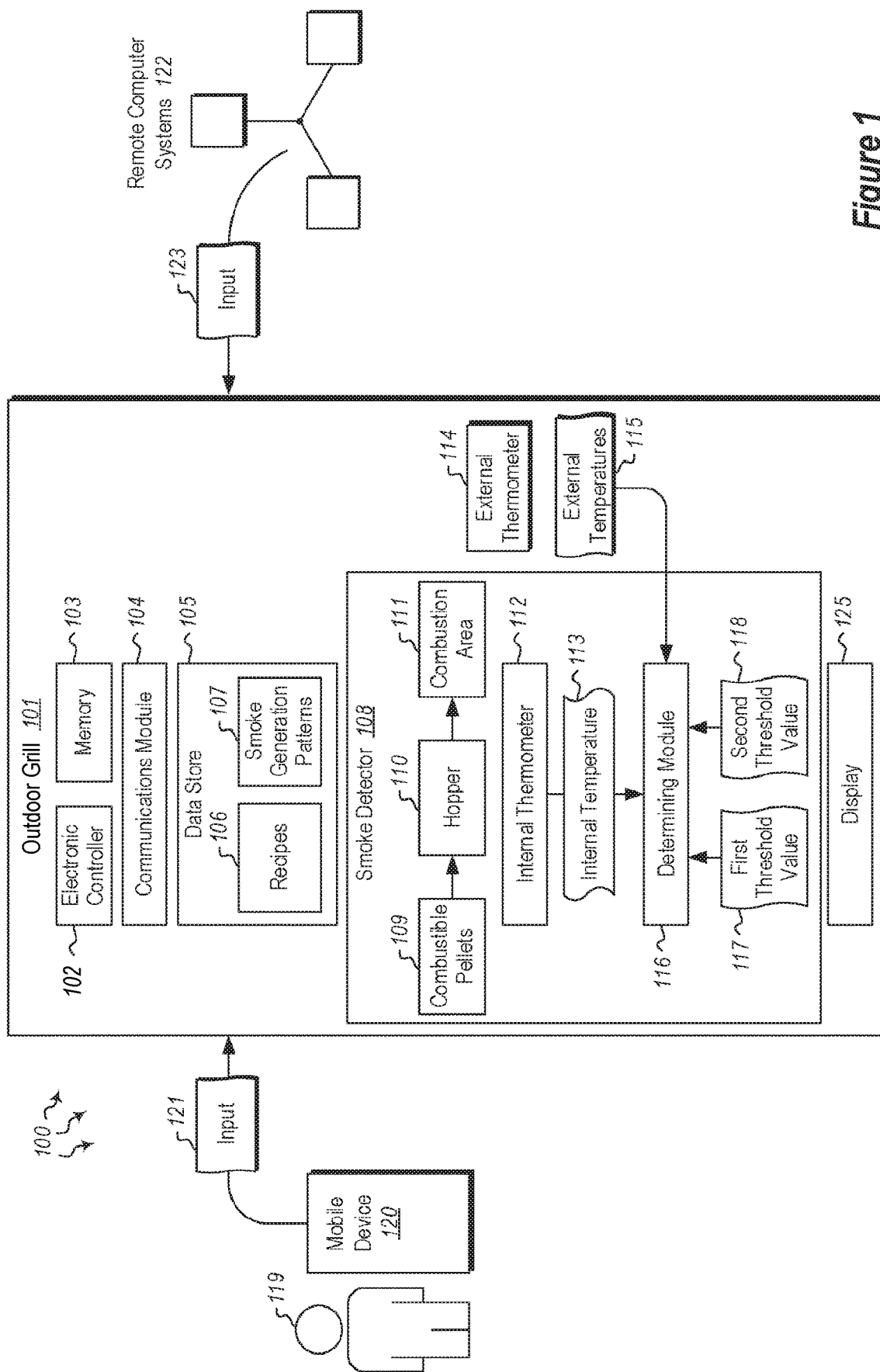
FIG. 1 illustrates a computer architecture in which embodiments described herein may operate including smoking food in an outdoor grill using a customized smoking routine.

Embodiments described herein are directed to smoking food in an outdoor grill using a customized grilling and/or smoking routine. In particular, embodiments of the present invention enable a user to implement automatic controls of an outdoor cooking apparatus from a remote location, in particular remote control of grilling and smoke-generating apparatus used for outdoor barbecues. Embodiments of the present invention can, for example, enable a user to assign a particular cooking profile, such as a flavor, temperature, or other profile, to a food item. The user can then remotely operate an outdoor cooking apparatus, such as a barbecue grill and/or barbecue smoker, so that the cooking apparatus automatically and/or dynamically adjusts several different components of the cooking apparatus in response to certain triggers (e.g., recipe steps) contained in the assigned cooking profile. In at least some embodiments of the present invention, therefore, a user can cook a food item in a wide variety of circumstances (e.g., time, food and/or outdoor temperature, amount of smoke, intended flavor) and still maintain a precise-end result.

For example, in one embodiment, an electronic controller of an outdoor grill (and/or smoker) receives an input from a remote computer system indicating that the outdoor grill is to initiate smoke generation according to a cooking profile based on a specified smoke generation pattern. The electronic controller of the outdoor grill performs the following according to the specified smoke generation pattern: adds a specified amount of combustible pellets to a combustion area within the outdoor grill, such that the combustible pellets begin to burn, measures a current internal temperature of the outdoor grill.

Upon determining that the current internal temperature is below a first specified threshold value of the cooking profile, the electronic controller of the outdoor grill adds a specified amount of additional combustible pellets to the combustion area sufficient to raise the temperature to a second specified threshold value. The electronic controller of the outdoor grill further allows the internal temperature of the outdoor grill to cool a temperature below the first specified threshold value and, upon determining that the temperature of the outdoor grill has cooled below the first specified threshold value, adjusts one or more components of outdoor grill to compensate, such as by adding a second specified amount of additional combustible pellets to the combustion area, adjusting an internal fan, or the like, sufficient to raise the temperature to at least the second threshold value.

In another embodiment, an electronically-controlled outdoor grill receives an input from a remote computer system indicating that the outdoor grill is to initiate smoke generation according to a specified cooking profile with a customized smoke generation pattern, where the customized smoke generation pattern was created by a user. The electronically-controlled outdoor grill analyzes the specified smoke generation pattern to determine, for example, how many (or at what speed) wood pellets are to be added to the combustion area by a hopper, to further determine when the wood pellets are to be added to a combustion area, and/or to determine one or more other factors, such as operation of an internal fan, or operating the fan at a particular speed.

The electronically-controlled outdoor grill then measures a current internal temperature of the outdoor grill and, upon determining the current internal temperature of the outdoor grill, initiates a set of appropriate actions, such as by initiating the customized smoking pattern. As part of the customized smoking pattern, the determined amount of wood pellets is added to the combustion area by the hopper at the determined time, adjusted according to the current internal temperature of the outdoor grill.

The following discussion refers to a number of methods and method acts that may be performed by one or more embodiments of the subject matter disclosed herein. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may be, for example, mobile phones, electronic appliances, laptop computers, tablet computers, remote control devices, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g., character, double, floating-point), composite types (e.g., array, record, union, etc.), abstract data types (e.g., container, list, set, stack, tree, etc.), hashes, graphs or any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates an environment 100 in which at least one embodiment described herein may be employed. The environment 100 includes an outdoor grill 101. As used herein, the term "outdoor grill" means outdoor cooking apparatus, including barbecue grills and/or barbecue smokers. Barbecue smokers, in turn, refers to outdoor cooking apparatus that are configured to cook food at least in part through generated smoke, such as smoke generated through wood combustion. Accordingly, the outdoor grill 101 illustrated or otherwise described herein may be any type of cooking appliance including a conventional barbecue grill, smoker or other device.

In general, the outdoor grill 101 includes hardware and other modules for performing a variety of different functions. For instance, the outdoor grill 101 includes an electronic controller 102. The electronic controller may be any type of microcontroller, microprocessor, or other processing means capable of processing software code. The software code may be stored on computer-readable media including memory 103 or other data storage 105. The data storage may be flash or other non-volatile memory. As such, the outdoor grill 101 may have sufficient processing power and memory to be considered a computing system, or at least as having an attached computing system.

FIG. 1 further shows that the outdoor grill 101 can include a communications module 104. The communications module 104 may be configured to communicate with other computing systems such as mobile device 120 used by user 119, or remote computer systems 122. As understood herein, a "mobile device" (120) means any computing system (including but not limited to a smart phone, e.g., FIGS. 2-3) that enables a user to provide remote inputs, selections, and other controls that are communicated with outdoor grill 101 from a remote location. The communication between mobile device and outdoor grill 101 can occur over a network comprising a combination of wireless and hardwired connections. For example, mobile device 120 may be wirelessly connected to a network, or may be connected to the network over a network cable, such as a cable employing an Ethernet, USB, or other appropriate connection interface.

Thus, mobile device 120 can comprise a mobile phone, a tablet device, or may comprise another form of a remote control display, such as a digital remote control, including a network-enabled tablet-style touch screen having a graphical user interface displayed thereon. In one implementation, for example, mobile device 120 comprises an LCD screen having one or more controls (e.g., touch screen controls or physical push-button controls) that are used primarily within an indoor environment, and in any event remote from the outdoor grill 101.

For example, the mobile device 120 may comprise a remote screen that is positioned or mounted on or about a kitchen countertop, but is nevertheless connected over a network (BLUETOOTH, WIFI, or network cable) to outdoor grill 101 and/or remote computer systems 122 over a network. Specifically, the communications module 104 may include any wired or wireless communication means that can receive and/or transmit data to or from other computing systems. The communications module 104 may be configured to interact with databases, mobile computing devices (such as mobile phones or tablets), embedded or other types of computing systems. In some cases, the mobile device 120 and/or the remote computer systems 122 may be configured to provide inputs to the outdoor grill 101. For instance, the mobile device 120 may provide input 121 to the outdoor grill 101, such as by providing a "cooking profile" for a food item. This input may specify a recipe that is to be used, which in turn may specify a custom smoking pattern (or other temperature or flavor profile pattern involving operation of multiple components on outdoor grill 101) that is to be used when preparing a certain portion of food. These recipes 106 and custom smoke generation patterns may be stored in data store 105 and accessed by the electronic controller 102.

The remote computer systems 122 may also provide inputs 123 to the outdoor grill 101. These inputs may likewise be recipes or custom grilling or smoking pattern controls, including fan (on/off, speed or RPM) and/or hopper/auger adjustments, but may also be advertisements or other data pertinent to the grill owner. For example, as will be explained further below, the remote computer systems 122 may provide remote diagnostics or analytic information to the grill owner, displayable on a grill 101 display.

FIG. 1 further shows that the outdoor grill 101 includes a smoke generator 108. In at least one embodiment, the smoke generator 108 includes hardware including a hopper 110 for loading combustible pellets 109 into the combustion area 111. In some embodiments, the outdoor grill 101 may be a smoker that is fueled by combustible pellets 109 (such as wood pellets, or other appropriate combustion precursor). The hopper 110 may supply the fuel to the combustion area 111 at a specified rate so as to maintain a specific internal temperature 113. The internal temperature may be measured by an internal thermometer 112 that is inside grill 101. The determining module 116 of the smoke generator 108 may, for example, determine that the current internal temperature 113 is too low, and may cause the hopper 110 to load more pellets/fuel 109 into the combustion area 111, and/or to adjust a fan or other components to help increase temperature. Conversely, if the internal temperature is too high, the loading of pellets/fuel into the combustion area 111 may be halted for a time until the temperature has cooled, and similarly to adjust a fan up/down or on/off to assist in cooling.

At least in some embodiments, the outdoor grill 101 may be controlled by user 119 via the mobile device 120. The mobile device 120 may be configured to run an application that allows the user 119 to control functionality of the outdoor grill 101. Using the software application, for example, the user 119 may cause the outdoor grill 101 to ignite and begin a specified "cooking profile" assigned to the food item, such as a recipe employing a particular smoking pattern geared toward a particular end result in the food item. For instance, the user 119 may direct use of a particular cooking profile for a food item by selecting one of the stored recipes 106 or smoke generation patterns 107 stored on the grill's data store 105, wherein the selected recipes 106 comprise one or more flavor, smoke, temperature or other cooking profile features for a particular food item.

Thus, the "cooking profile" in at least one embodiment comprises a set of values contained in one or more files associated with a food item, such as files contained in a downloadable recipe (from computer systems 122), which are intended to produce a particular end result in the food item. For example, a cooking profile for a particular type of beef may include specifications that the final product be "medium rare," or reddish pink in terms of internal color, and/or may specify an internal temperature for the food item, such as 135° F. (57° C.). The cooking profile may alternatively indicate that the meat needs to be tender enough to shred, or contain a certain amount of smoke flavor in the meat.

Each of these end results may be driven in part by a downloaded recipe, or by manual inputs by a user at grill 101 or via mobile device 120. The recipe may include such values as cooking time, amount of smoke applied and when, internal grill temperature, and so on. The cooking profile, in at least one implementation, may be used to adjust certain recipe steps in accordance with other variables that occur during a cooking cycle to ensure the overall end result. In general, therefore, a cooking profile can be understood as overall characteristics of a food item based on an intended end result for the particular food item, whereas a "recipe" refers to the generally modifiable steps used to achieve the end result.

Accordingly, embodiments of the present invention provide a grill system that enables the user to automatically control various aspects of a cooking process for different performance levels. In particular, embodiments of the present invention enable a user to automatically or manually monitor and adjust a grill temperature, to change or start a timer, to adjust a smoking pattern, to set the grill to a "keep warm," or to adjust other state, or to perform other controls specifically geared toward a particular flavor or other desired end result.

Embodiments of the present invention allow the user to be as involved or uninvolved as desired, and to handle grilling procedures from a remote location. In particular, embodiments of the present invention enable a user to have part or full control over cooking a food item, and thus operation of multiple components of the outdoor grill in general accordance with multiple user preferences to whatever extent the user desires to be involved in controlling the operation or outcome, and regardless whether the user is away on travel, or at home in a living room.

Figure 2:
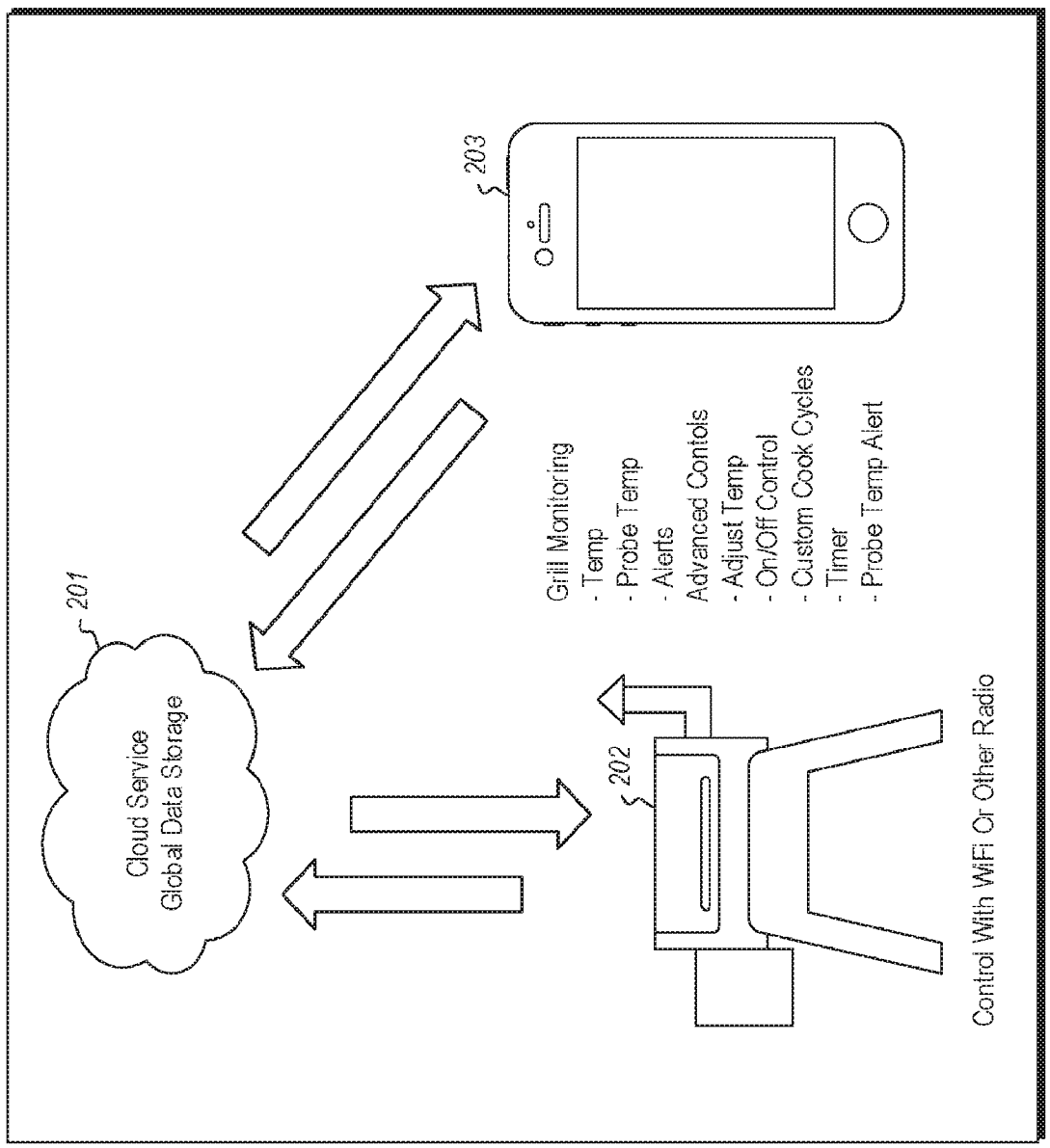
FIG. 2 illustrates an embodiment in which an electronically-controlled appliance is in communication with a cloud service and a mobile electronic device.

To enable these and other features, FIG. 2 shows that outdoor grill 101 may receive instructions from—and be controlled by—a mobile computing system and/or by a cloud computing system (or "cloud service") 201. In particular, FIG. 2 illustrates an embodiment in which a grill/smoker 202 is controlled via a mobile device 203 (e.g., the depicted smart phone 120 or other remote device as previously described configured with appropriate software). FIG. 2 shows that the smart phone 120 may communicate with a cloud service 201 which, in turn, communicates with the grill/smoker 101. The cloud service 201 may provide data storage along with other features. The data storage may store, for example, recipes used by the grill/smoker 101 to smoke meats, vegetables, fruits or other food items. Using the cloud service 201, a customer or user may use their appropriately configured mobile device (e.g., phone 120, tablet, laptop, remote control, desktop or other computer system) to control the functions of the grill/smoker 101.

The functionality may include grill/smoker 101 monitoring, including monitoring of the internal temperature, external ambient air temperature, probe temperature (e.g., from probes that communicate wirelessly), and alerts that may be raised by grill 101 or smoker. Other controls may include adjusting the temperature by adding more fuel (such as pellets), or allowing the existing fuel to burn down so as to reduce the temperature, turning the device on or off or turning certain components, including operation or operational speed of a fan. The cooking profile factors can also include controlling the timer or custom cooking cycles, or monitoring probe temperature alerts. Many more controls of the grill 101 may be provided through the smart phone 120, and the amount and type of controls may be updated over time to add new functionality.

As control inputs are received at the smart phone 120 (or other electronic device), they are passed to the cloud service 201 via a wired or wireless data transmission. The control inputs are then passed to the grill/smoker 101 directly or via an access point such as a WIFI router. In this manner, a user may be able to control their grill/smoker 101 from substantially any location that has internet access. In some cases, the user may even be able to ignite the outdoor grill/smoker 101 remotely, while in other cases, such functionality may be disabled unless the user is within a specified distance of grill 101, as determined by a GPS or BLUETOOTH geo-fence.

Figure 3:
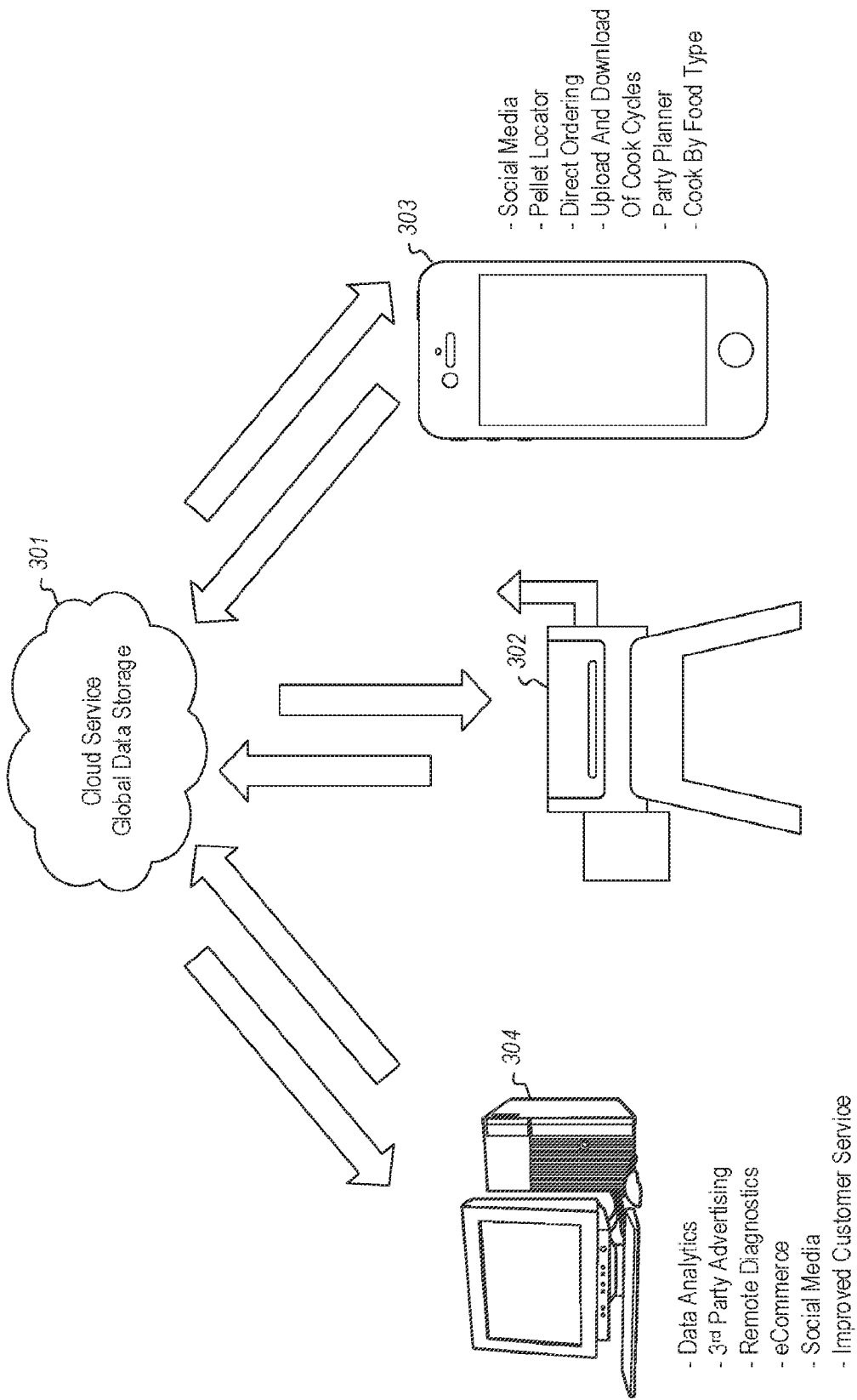
FIG. 3 illustrates an embodiment in which an electronically-controlled appliance is in communication with a cloud service and a mobile electronic device, and is further in communication with analytics, social media or other third party systems.

FIG. 3 illustrates an environment similar to that of FIG. 2 in which a cloud service 301 links various devices including a grill/smoker 302, a remote computer system (e.g., hosting services 304), and a mobile device 303 (e.g., the depicted smart phone, or other electronic computing device). In this case, the cloud service 201 may (e.g., via remote computer system 122) be configured to handle one or more additional services 304, including, but not limited to, data analytics, third party advertising, remote diagnostic services, eCommerce services, social media, customer service assistance and others. For example, usage data for the outdoor grill/smoker 101 may be uploaded to the cloud service 201, and stored in a connected global data storage.

This usage data (such as when the smoker was turned on, how long was it turned on, what temperature did it reach, what was the average internal temperature, what was the average external temperature, what cooking/smoking recipe was used, what controls were used—e.g., fan and/or auger usage, speed—and when or other operational usage data) may be analyzed by an analytics engine in combination with data from other users. As such, usage data from many different users may be logged and analyzed to identify broad patterns of use. These analytics may then be used to refine and improve future smokers or grills, or may be used for other purposes such as refining cooking profiles for a given food item, adjusting recipes, providing advertising.

In one example, the cloud service 201 may track users' usage of the grill/smoker 101, and may determine which products or recipes may be of interest to a given user based on similarities between their usage of grill 101 and other's usage. The usage data may also be used to perform remote diagnostics of the grill/smoker 101. For instance, the usage data may indicate that a user's grill temperature 113 exceeded a normal operating temperature (e.g., due to a grease fire). As such, certain parts may have failed or may be likely to fail due to the extreme heat. Other usage data may indicate different problems that may be likely to occur as a result of how the user is using their grill. Usage data may also be sent to social media announcing successful implementation of a recipe, or announcing to party guests that a specified meat is smoking and will be ready at a certain time. Many other social media implementations may also be used as provided by the cloud service 201.

Figure 4:
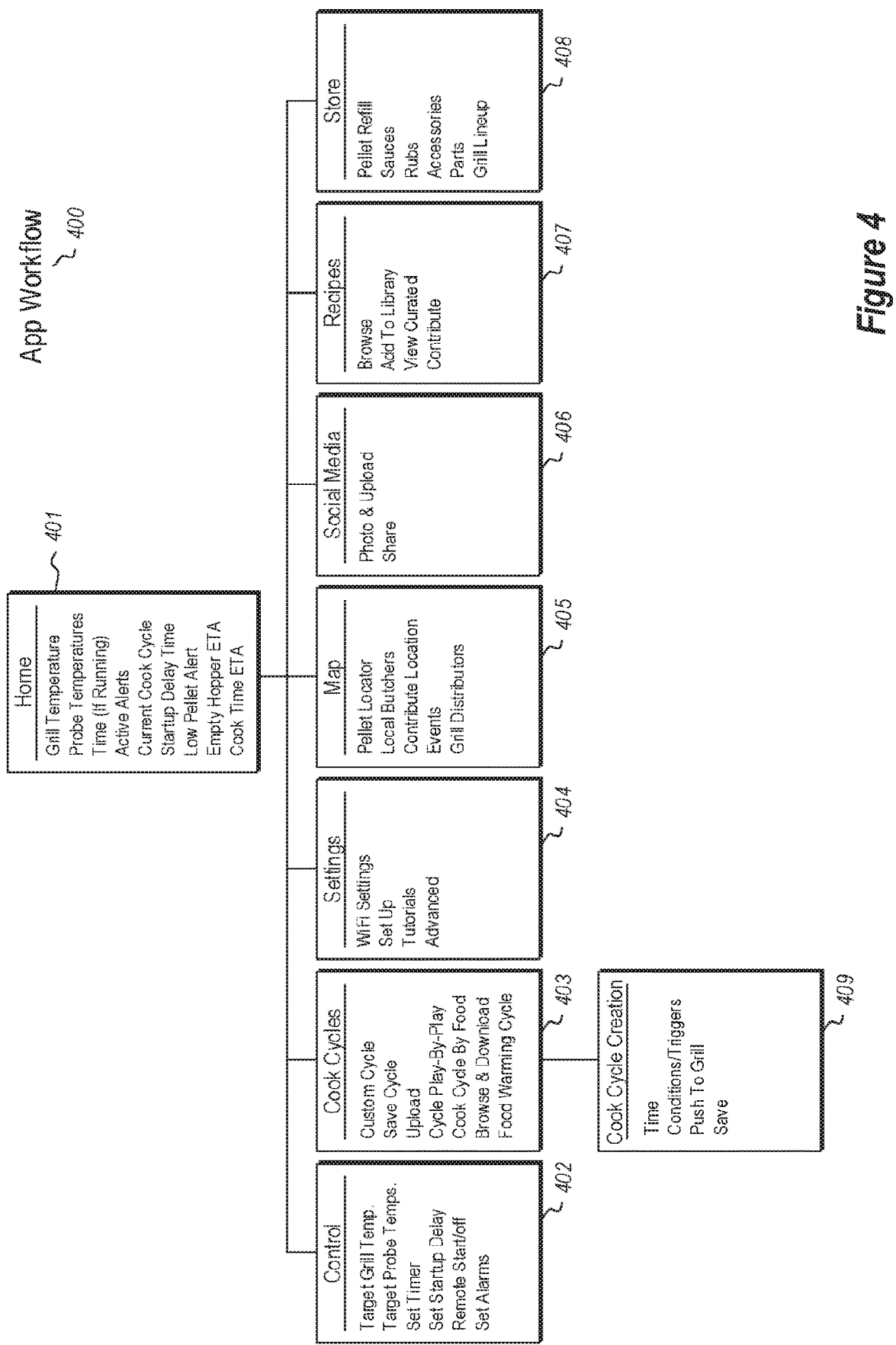
FIG. 4 illustrates an embodiment of a software application functionality hierarchy.

FIG. 4 illustrates an application workflow 400 for a software application such as application 106 of FIG. 1. The application may run on a mobile device 120, such as a phone, tablet, remote control, or wearable device, or may be run on a desktop computing system or may be run through a web browser, such as previously described herein. It will be understood that the application workflow 400 is one example of an application workflow, and other embodiments and implementations are possible.

FIG. 4 shows that an exemplary application workflow 400 can include a home menu 401 that, on launch, shows the status of grill 101 (or other electronically-controlled appliance), the status of any probes in use, the status of any timers or other grill 101 controls in use and any alerts. A first time setup may walk a user through connecting grill 101 to an access point (such as a WIFI access point), and linking the mobile device to grill 101. The first time setup may also take the user through a tutorial on how to use grill 101, or at least certain components thereof. The home menu 401 may show any or all of the following: grill temperature, probe temperature, timer (if running), active alerts (e.g., a low pellet alert or an empty hopper alert), current cook cycle, current cook time-to-completion, startup delay time, or other information.

The application may have many different tabs and menus, including one or more of the following: a control menu 402 that allows users to control the grill's target temperature, control the grill's target probe temperatures, set or restart timers, set startup delays, remotely start or turn grill 101 off, set alerts or perform other functionality. A cook cycles menu 403 may be provided which allows users to select from different cooking cycles (i.e., pre-programmed cooking routines that control temperature for a specified amount of time to cook or smoke the food item in a certain manner), save cooking cycles, upload cooking cycles to a cloud service (e.g., 201 of FIG. 3), provide the user a play-by-play indicator of what is occurring during a cooking cycle, implement a certain cook cycle for a given food, browse and download recipes and/or cook cycles, provide access to a food warming cycle that keeps the food at a certain temperature for a specified time, or perform other functions.

The cook cycles menu 403 may have one or more submenus including a cook cycle creation menu 409. The cook cycle creation menu 409 may allow a user to create his or her own custom cooking cycle. The custom cooking cycle can specify a given time to begin and end, a certain temperature to hold or change to throughout the cycle, various customizable triggers or conditions that may cause changes to the cooking cycle such as shortening or lengthening the cooking time, or increasing or decreasing internal grill temperature 113 for a given length of time. The cook cycle creation menu 409 may allow a user to push the customized cooking cycle to grill 101 and have the grill begin implementation of the cycle. This customized cooking cycle may also be saved directly on grill 101 or in the cloud service 201.

Other menus provided on the application workflow may include a settings menu 404. The settings menu may allow a user to set up WIFI, BLUETOOTH or communication means on grill 101. The settings menu 404 may also allow configuration settings to be accessed and changed. The settings menu 404 may further provide tutorial as well as other appliance—or application—specific settings that may be changed using the settings menu. A map menu or tab 405 may be provided which gives access to local retailers including pellet sellers or distributors, local butchers or farms for meat or vegetables, local events including barbeques or tailgate parties, or locations of nearby grill 101 distributors. The map menu 405 may also provide other information that is specific to the appliance, such as a repair shop that specializes in repairs for that appliance.

A social media menu 406 may be provided which allows users to upload photos, recipes, videos or other media which may be of interest to other users. The social media tab may allow the user to post images or status updates to social media websites, including location pins, updates from grill 101 itself or other information. As such, the social media menu 406 allows users to share their grilling/smoking experience with others.

A recipes menu 407 allows users to browse recipes available online or through the cloud service 201. When browsing these recipes, the user may select an icon that enables a download of one or more recipes to their phone or other mobile device. These recipes can be collected in a local or cloud-based library, and shared via social media. Users can sort the recipes, add their own recipes, add pictures to others' recipes or otherwise interact with the recipe database. A store menu 408 allows a user to purchase pellets, propane or other fuel, purchase sauces, rubs, grill accessories, grill parts or full grills/smokers. The store may be expanded to allow the purchase of food items or other items that may be used in conjunction with grill 101. The concepts described above will be explained further below with regard to methods 500 and 900 of FIGS. 5 and 9, respectively.

Figure 5:
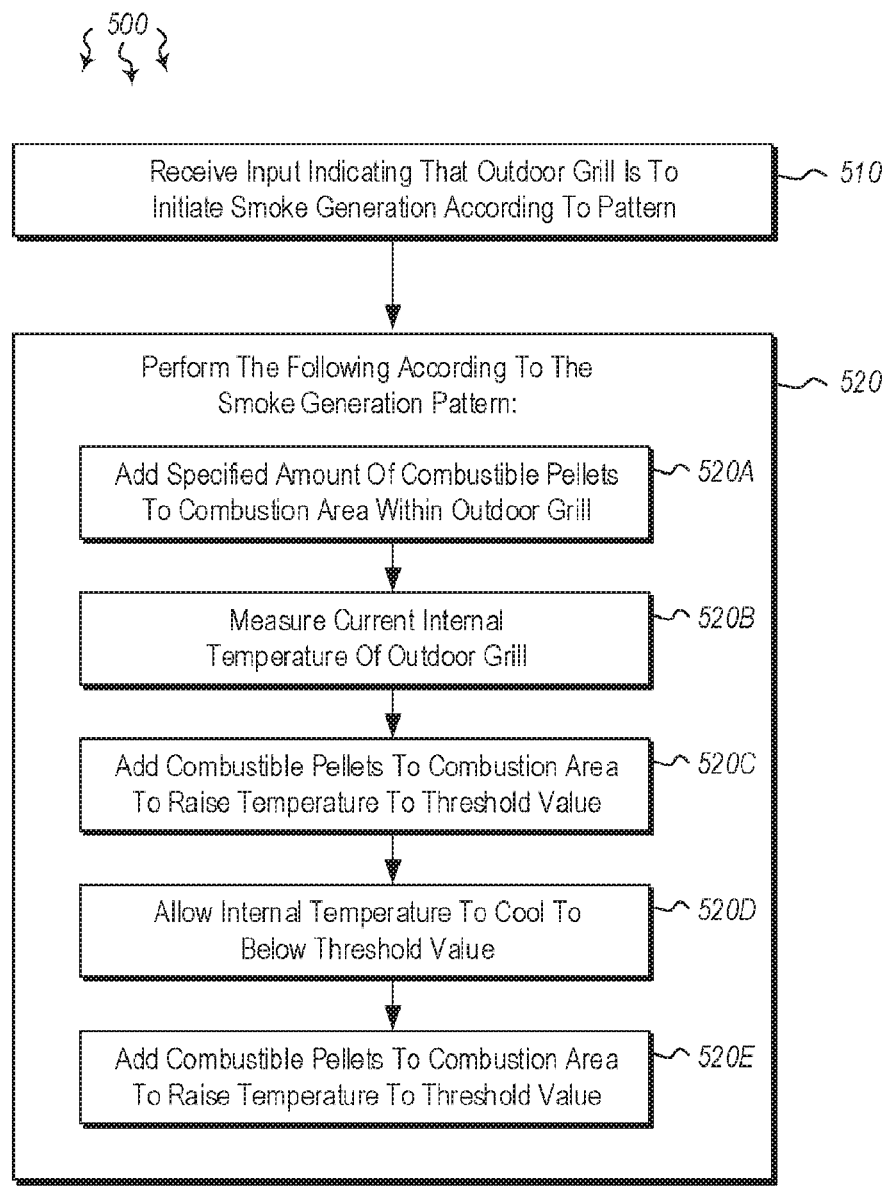
FIG. 5 illustrates a flowchart of an example method for smoking food in an outdoor grill using a customized smoking routine.
Figure 9:
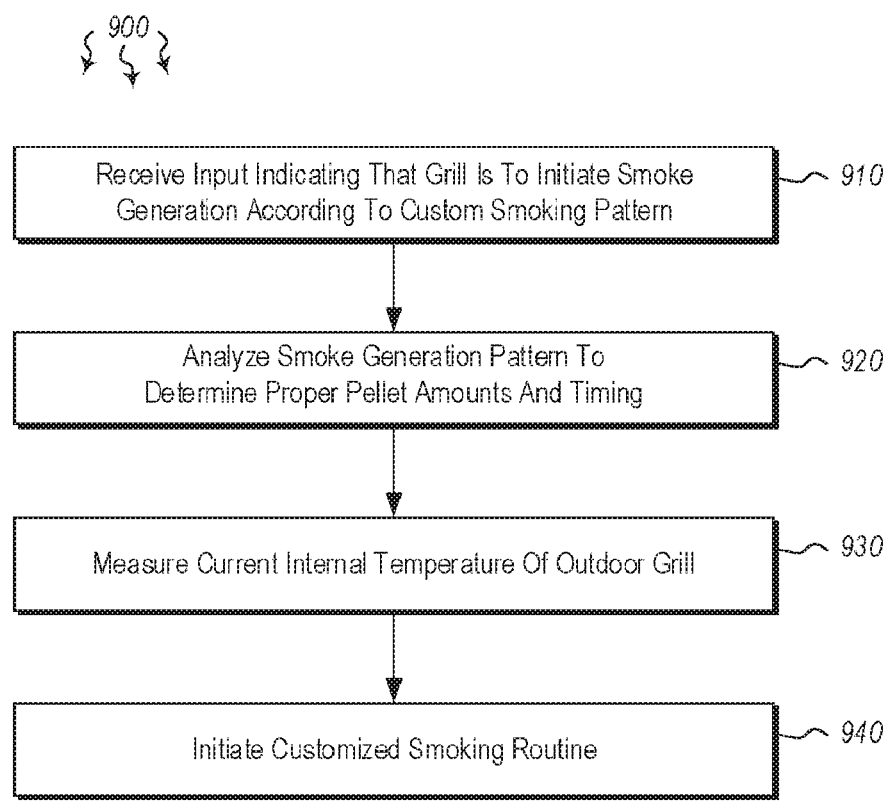
FIG. 9 illustrates a flowchart of an alternative example method for smoking food in an outdoor grill using a customized smoking routine.

In particular, FIGS. 5 and 9 provide flow charts that illustrate or otherwise describe methodologies that may be implemented in accordance with the above-disclosed subject matter. For purposes of simplicity of explanation, the methodologies are shown and described as a series of blocks. However, it should be understood and appreciated that the claimed subject matter is not limited in all embodiments by the order of the blocks, as, in some embodiments, some blocks may occur in different orders and/or concurrently with other blocks from what is depicted and described herein. Moreover, not all illustrated blocks may be required to implement the methodologies described hereinafter for all embodiments.

For example, FIG. 5 illustrates a flowchart of a method 500 for smoking food in an outdoor grill 101 using a customized smoking routine. The method 500 will now be described with frequent reference to the components and data of environment 100 of FIG. 1.

Specifically, FIG. 5 shows that method 500 includes receiving an input from a remote computer system indicating that the outdoor grill 101 is to initiate smoke generation according to a specified smoke generation pattern (510). For example, FIG. 1 shows that outdoor grill 101 may receive input 123 from remote computer system 122 indicating that the outdoor grill 101 is to initiate smoke generation according to one of smoke generation patterns 107. The smoke generation patterns 107 may specify timing and temperature procedures for smoking a portion of food.

Figure 6:
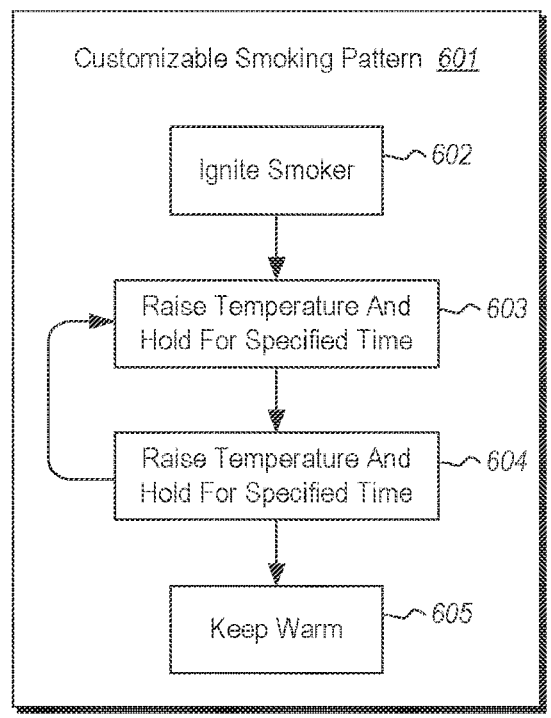
FIG. 6 illustrates an example embodiment of a customizable smoking pattern for use with a grill or smoker.

For example, as shown in FIG. 6, a customizable smoking pattern 601 may include multiple elements. The pattern may initially begin by performing a step 602 of igniting the combustion area 111 of the grill/smoker 101. The ignition step 602 may occur with the user present at grill 101, or while the user is at another location. Once the smoker is ignited, the smoke generator 108 will add fuel (such as combustible pellets 109 using the hopper 110) to raise the temperature 603 of the smoker 101, and hold it for a specified amount of time. Holding the temperature may involve continually adding pellets 109 to the combustion area 111 at a specified rate, and may include other control adjustments such as fan operation (on/off) fan speed (RPMs), which are consistent with the overall intended cooking profile. This rate may vary depending on the determined external temperature 115. Indeed, if the grill/smoker 101 is being operated during the winter and the outdoor temperature is very cold (as determined by external thermometer 114), the determining module 116 of the smoke generator may determine that additional fuel/pellets need to be added in order to maintain the specified temperature.

The customizable smoking pattern 601 may further specify a time to cool 604. With some meats, vegetables or other foods, it may be desirable to allow the grill/smoker 101 to cool to a specified temperature for a certain amount of time, and then heat it back up again. Accordingly, the customizable smoking pattern 601 may alternately adjust between periods of heating (603) and periods of cooling (604), which can provide certain preset triggers that result in automatic adjustment of the auger/hopper operation, fan operation, or the like. Once the food item is finished cooking/smoking, grill 101 may be automatically set in accordance with the cooking profile for the food item to a "keep warm" state 605, in which a specified temperature is maintained within grill 101 until the user has retrieved their food, and thus resulting in corresponding adjustments to the auger, fan, etc.

FIG. 5 further shows that the method 500 includes performing the following according to the specified smoke generation pattern (520) for the assigned cooking profile: adding a specified amount of combustible pellets to a combustion area within the outdoor grill 101, such that the combustible pellets begin to burn (520A), measuring a current internal temperature of the outdoor grill 101 (520B), upon determining that the current internal temperature is below a first specified threshold value 117, adding a specified amount of additional combustible pellets to the combustion area sufficient to raise the temperature to a second specified threshold value 118 (520C), allowing the internal temperature of the outdoor grill 101 to cool a temperature below the first specified threshold value (520D) and, upon determining that the temperature of the outdoor grill 101 has cooled below the first specified threshold value, adding a second specified amount of additional combustible pellets to the combustion area (and/or adjusting other controls, such as the fan operation and/or speed) sufficient to raise the temperature to at least the second specified threshold value (520E).

Figure 7:
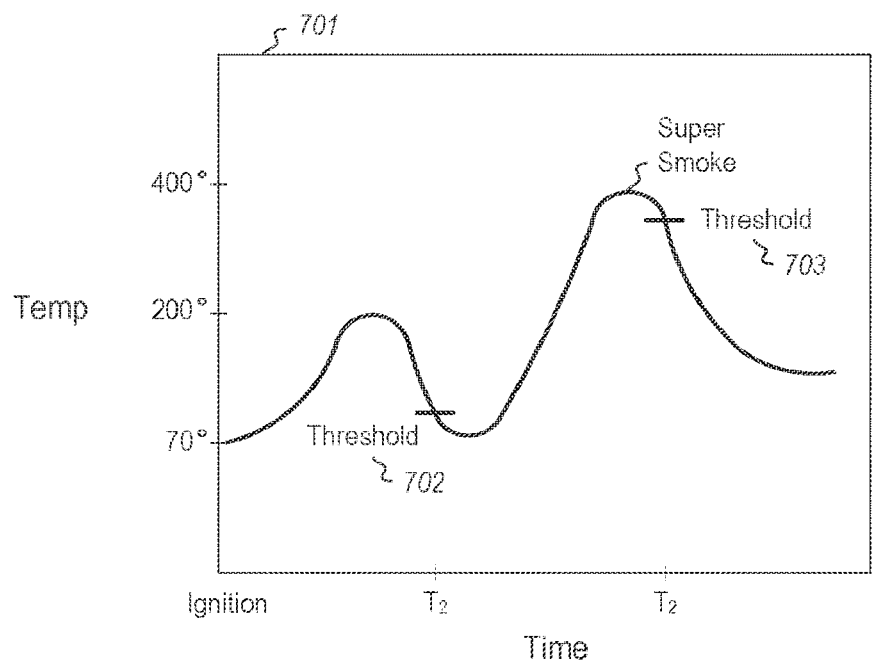
FIG. 7 illustrates an example graph showing temperature change over time for a super smoke smoking cycle.

One embodiment of such a smoke generation cycle is shown in the graph of FIG. 7. In particular, graph 701 depicts time on the X-axis and internal grill temperature 113 on the Y-axis. At the time of ignition, the internal grill temperature 113 is most likely the same as the ambient air temperature (if grill 101 hasn't been used in the last few hours). Thus, in graph 701, the internal grill temperature 113 is 70 degrees Fahrenheit. As in step 520A of FIG. 5, combustible pellets 109 are added by the hopper 110 to the combustion area 111 of the outdoor grill 101 where they begin to burn, thereby increasing the temperature. After a specified time where no (or few) pellets are added to the combustion area, the internal temperature is taken again (520B). The determining module 116 determines that the internal temperature 113 is below a first specified threshold value 702 (for example, the temperature may have fallen back to (or close to) the ambient air temperature at time T1).

As a result of the determination, various components of the grill 101 can be adjusted to raise the temperature. For example, grill 101 may be instructed to add a specified number of pellets to the combustion area (and a fan may also be adjusted) sufficient to raise the temperature to a second specified threshold value (520C). This second specified threshold value 703 may be a much higher temperature than was originally reached (e.g., 400 degrees, as compared to 200 degrees, as shown in FIG. 8). The second specified threshold value 703 may represent a super smoke cycle where the meat or other food is smoked at a very high temperature. The high temperature may have desirable effects on the food, imbuing more smoke flavor and improving the texture of the food. The internal temperature of the outdoor grill 101 may then be allowed to cool (by preventing additional pellets from being burned, and/or adjusting an internal fan or blower) to a temperature below the first specified threshold value 702 (520D).

After determining that the internal temperature of the outdoor grill 101 has cooled below the first specified threshold value 702, the determining module 116 may adjust other controls (for pellet flow, fan usage, etc.) to raise the internal temperature. For example, the determining module 116 may determine that additional pellets are to be supplied to the combustion area sufficient to raise the internal temperature to at least the second specified threshold value 703 (520E). Thus, in this manner, the high (super smoke) temperature may be reached repeatedly throughout the smoking process. In some cases, the smoke generation pattern 107 specifies which temperature is to be reached and when along a timeline. The internal temperature may be allowed to rise and fall according to the smoke generation pattern specified for the particular cooking profile for the given food item. Each recipe/cooking profile may have its own smoke generation pattern, and thus a user may simply select a recipe, send the selection to grill 101, and have grill 101 automatically carry out the smoke pattern associated with the recipe.

Thus, in this manner, the mobile device 120 of FIG. 1 may have its software application provide the input 121 indicating that the outdoor grill 101 is to initiate smoke generation according to the specified smoke generation pattern 107. The input 121 may be received via a wireless communication link established between the mobile electronic device 120 and the outdoor grill 101. The smoke generation pattern 107 specified by the input enables smoke generation at multiple temperatures. In some cases, the smoke generation occurs within the outdoor grill 101 when the grill's internal temperature is 400 degrees or greater.

When the outdoor grill 101 receives a recipe 106 or smoke generation pattern 107 as an input from an external computer system, it may alternatively replace or supplement an existing recipe or smoke generation pattern. For instance, if the recipe or smoke generation pattern is already stored in data store 105, then it would not need to be replaced. If the recipe or smoke generation pattern is new, it could be stored in addition to any existing recipes or patterns. If the recipe or smoke generation pattern is a variant on an existing recipe or pattern, or contains user customizations, the newly received version may supplement or displace the existing recipe or smoking generation pattern, and may even be uploaded back to the remote computer systems 122 for later use.

Thus, a user may take an existing recipe or pattern and customize it, or the user may simply create their own user-customized smoke generation pattern 107. Such user-customized smoke generation patterns may be generated using a software application on the mobile device 120. The mobile device, which is communicably connected to the outdoor grill 101, may then transmit the input to grill 101 using a wired or wireless communication means. In some cases, the user-customized smoke generation pattern may be derived from—and may thus supplement—an existing smoke generation pattern. In such cases, parts of both the existing smoke generation pattern and the user-customized smoke generation pattern are used when smoking the food.

A digital thermometer or digital probe may be implemented to monitor the grilling process consistent with the cooking profile for the food item. In particular, the digital thermometer may track the internal temperature of the food as it is being cooked. The digital thermometer may be configured to communicate with the outdoor grill 101 and/or with the software application running on the mobile electronic device 120. In particular, the determining module 116 of the smoke generator 108 may take the readings from the digital probe into account when running the smoke generation pattern. Thus, if the readings from the digital probe are continually low/high, the internal temperature of grill 101 may be increased or decreased to compensate. Thus, a smoke generation pattern and other grilling variables may be altered mid-cycle automatically based on readings from the probe, and in response to metrics specified by the cooking profile for the food item. Additionally or alternatively, the smoke generation pattern may be altered mid-cycle according to input 121 provided by the user 119, and thus be customized relative to whatever program or recipe is then in process.

The outdoor grill 101 may be configured to display settings, controls, recipes or other information on an external display 125 visible to a user. The display 125 may be mounted at a predesignated spot on grill 101. The computer-readable media of grill 101 (e.g., data store 105) along with the electronic controller 102 may be configured to generate a user interface that displays outdoor grill 101 function values. These function values may be shown with a specified level of prominence. Moreover, this level of prominence may change automatically over time.

Figure 8A:
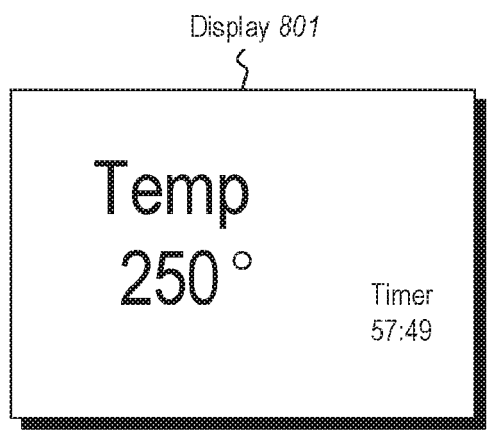
FIGS. 8A and 8B illustrate example embodiments of a display mounted on a grill.
Figure 8B:
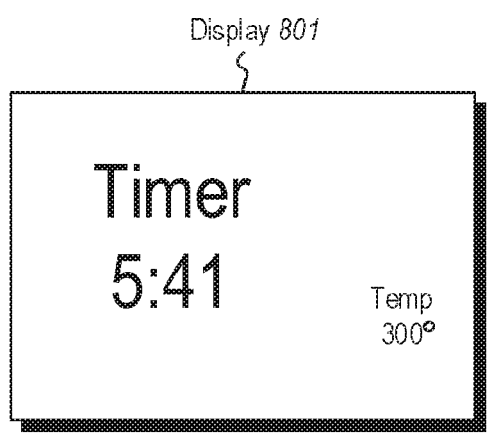

For example, as shown in FIG. 8A, temperature information is shown much more prominently than the timer. At a certain point in the smoking cycle, temperature information may be much more useful to the grill user than timer information, and will be shown in the display as such. On the other hand, at another point in time, it may be more useful to show the timer as opposed to temperature or other information (as shown in display 801 of FIG. 8B).

Other information may also be shown on the display, of course, and there may be multiple levels of prominence (e.g., three or more). Thus, a user interface shown in the display 801 may display one outdoor grill 101 function value (e.g., temperature) with a specified level of prominence in a display, and this prominence may vary in response to various factors (relative importance, user specification, immediacy of input or required user adjustment) during cooking. In particular, the changeover may occur upon the occurrence of a specified event. For example, once a certain temperature is reached (e.g., 450 degrees), time is more important to display than temperature, so it is shown more prominently (FIG. 8B), while other function values are reduced.

FIG. 9 illustrates a flowchart of a method 900 for smoking food in an outdoor grill 101 using a customized smoking routine/cooking profile for a food item. The method 900 will now be described with frequent reference to the components and data of environment 100.

As discussed above with regard to FIG. 1, an electronically-controlled outdoor grill 101 may be provided which includes a combustion area 111, a hopper 110 configured to provide wood pellets 109 to the combustion area, an electronic controller 102, and one or more computer-readable storage media 105 having stored thereon computer-executable instructions that, when executed by the electronic controller, cause the electronic controller to perform a method for smoking one or more portions of food using a customized smoking routine.

The method (900) includes receiving an input 121 from a mobile device 120 or from a remote computer system 122 indicating that the outdoor grill 101 is to initiate smoke generation according to a specified, customized smoke generation pattern 107 that was created by a user (910). The electronic controller 102 analyzes the specified smoke generation pattern 107 to determine what controls need to be adjusted at grill 101, e.g., how many wood pellets are to be added to the combustion area 111 by the hopper 110 (920). The analysis further determines when the wood pellets 109 are to be added to the combustion area 111. This may include devising a timeline upon which pellets are to be added, either in large groups of pellets, or in a steady stream of single pellets.

FIG. 9 further shows that method 900 next includes measuring a current internal temperature of the outdoor grill 101 (930) using internal thermometer 112 and, upon determining the current internal temperature 113 of the outdoor grill 101, initiating the customized smoking routine (e.g., 601 of FIG. 6) (940). Accordingly, the determined amount of wood pellets 109 are added to the combustion area 111 by the hopper 110 at the determined time (or according to the determined timeline), adjusted according to the current internal TEMPERATURE of the outdoor grill 101 (940). Other controls may also be adjusted at outdoor grill 101, such as operation and/or speed of a fan, venting, or the like.

For example, the customized smoking pattern may be continually adjusted according to a determined internal temperature 113. Additionally or alternatively, the customized smoking pattern may be continually adjusted according to a current external ambient temperature 115 during the customized smoking pattern. As such, if the internal temperature is being drastically affected by the external temperature, controls in grill 101 may be adjusted, such that more or fewer pellets may be applied to the combustion area 111 to regulate the temperature, or to heat or cool it according to the custom smoking cycle.

In some cases, when a customized smoke generation pattern (e.g., 601) is received at grill 101, the customized smoke generation pattern is initiated automatically upon reception by grill 101. This allows a user to initiate a smoking pattern from anywhere in the world that has an internet connection. The customized smoke generation pattern may be received at grill 101 via a wireless network to which grill 101 is communicably connected. The customized smoke generation pattern may be stored in the data store 105, or may only be temporarily stored in the memory 103. The customized smoke generation pattern may displace or supplement any existing smoking patterns that are already pre-programmed into the grill's memory.

In some cases, grill 101 may be pre-programmed to provide a steady, consistent heat. This program may be overridden by a user's customized program, such as a super smoke program. If the user implements such a super smoke program, combustible pellets 109 may be released according to a determined timeline. The pellets may be supplied to the combustion area 111 where they smolder, creating smoke. Over time, grill 101 temperature drops and the pellets combust (e.g., T1 of FIG. 7). This causes the temperature to spike (e.g., T2 of FIG. 7), and then subsequently, more pellets may be introduced and the cycle continues according to the customized smoke generation pattern 107. Thus, a user can choose a consistent performance, or can override and use a customized smoking pattern such as a super smoke pattern instead.

Accordingly, the disclosed methods, systems and computer program products enable a variety of user cooking controls, particularly in relation to smoke-based cooking cycles, over a remote communication. In at least one embodiment, the methods, systems and devices described herein enable a user to cook food in an outdoor grill or smoker using a customizable set of steps directed to a particular end result, such as a particular flavor profile requiring a certain amount of smoke or other flavor controls. The steps can be created by the user on a computer device, or can be downloaded from a remote location for operation at the outdoor grill so that the cooking and adjustments occur entirely automatically. Moreover, electronically-controlled outdoor appliances are provided including grills and smokers which smoke food using a customized cooking/smoking routine.

One will appreciate therefore that embodiments of the present invention enable outdoor cooking of one or more food items to be handled not only on an automatic basis from a local or remote location, but also or alternatively on a basis that is customized for a particular food item, recipe, cook time, flavor profile, or other result desired by the user. Along these lines, embodiments of the present invention allow creation and use of specific cooking profiles associated with a particular food item, including various characteristics of the completed food item.

The cooking profile, in turn, comprises a plurality of triggers and modifiers that can be either automatically adjusted or tuned by the controllers at the grill/smoker despite a variety of different circumstances during a cooking cycle or in the cooking environment. Specifically, the inventive methods, systems, and apparatus enable a user to continuously monitor, control, and adjust various cooking components automatically (or manually if desired) in response to a wide range of factors that present themselves during a cooking cycle, or otherwise are previously dictated by the user or through a recipe downloaded by the user. Such varying factors include internal and external temperature of the grill, internal food temperature, expected texture or internal rigidity of the food item, the effect of any applied seasonings, sauces, or rubs on the food item, and so forth. Thus, embodiments of the present invention enable a user to modify a host of operations at an outdoor grill, including auger operation and speed, fan operation and speed, smoke generation, temperature, or the like, all through one or more user-accessible controls on a mobile device.

In particular, one will appreciate in view of the present specification and claims that embodiments of the present invention provide a number of advantages and solutions over conventional systems.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A smoker, comprising:
   a combustion area;
   a hopper for providing wood pellets to the combustion area; and
   an electronic controller comprising:
     at least one processor; and
     at least one non-transitory computer-readable storage medium storing instructions thereon that, when executed by the at least one processor, cause the electronic controller to:
       receive a first communication from a cloud computing platform via a direct network connection with the cloud computing platform, the first communication comprising a first set of instructions that the smoker is to operate in a first mode of operation and maintain a set internal temperature;
       receive a second communication from the cloud computing platform, the second communication comprising a second set of instructions that the smoker is to operate in a second mode of operation to increase smoldering within the combustion area;
       based at least partially on the second set of instructions, determine a wood-pellet feed rate to the combustion area to achieve the a higher level of smoldering; and
       initiate the second mode by causing the hopper to feed wood pellets into the combustion area according to the wood-pellet feed rate.

2. The smoker of claim 1, wherein the second set of instructions permits the smoker to maintain an internal temperature within a range of temperatures.

3. The smoker of claim 2, wherein causing the hopper to feed wood pellets into the combustion area according to the wood-pellet feed rate comprises increasing the wood-pellet feed rate to the combustion area.

4. The smoker of claim 2, wherein causing the hopper to feed wood pellets into the combustion area according to the wood-pellet feed rate comprises increasing the wood-pellet feed rate to the combustion area to cause an overall inefficient burn of the wood pellets within the combustion area.

5. The smoker of claim 2, further comprising determining the wood-pellet feed rate based at least partially on a current internal temperature of the smoker and the permitted range of temperatures.

6. The smoker of claim 1, further comprising instructions that, when executed by the at least one processor, cause the electronic controller to:
   continuously determine a current ambient temperature external to the smoker during the second mode of operation; and
   automatically adjust the wood-pellet feed rate to the combustion area according to changes in the determined current ambient temperature during the second mode of operation.

7. The smoker of claim 1, wherein the second set of instructions further comprises instructions for a fan of the smoker to provide air flow to the combustion area to achieve the higher level of smoldering.

8. The smoker of claim 1, wherein receiving the first and second communications from the cloud computing platform comprises receiving the first and second communications via a wireless network to which the smoker is communicably connected.

9. The smoker of claim 1, wherein the first and second communications represent user-made selections on a remote device.

10. A smoker, comprising:
    a combustion area;
    a hopper for providing wood pellets to the combustion area; and
    an electronic controller comprising:
      at least one processor; and
      at least one non-transitory computer-readable storage medium storing instructions thereon that, when executed by the at least one processor, cause the electronic controller to:
        receive instructions that the smoker is to initiate a mode of operation that results in a higher level of smoldering within the combustion area relative to a default mode of operation and that permits the smoker to maintain an internal temperature within a range of temperatures;
        based at least partially on the received instructions, a current internal temperature of the smoker, and the permitted range of temperatures, determine a wood-pellet feed rate to the combustion area to achieve the higher level of smoldering while maintaining an internal temperature within the range of temperatures; and
        initiate the mode of operation by causing the hopper to feed wood pellets into the combustion area according to the wood-pellet feed rate.

11. The smoker of claim 10, wherein receiving instructions comprises receiving a communication comprising the instructions from a cloud computing platform via a direct network connection with the cloud computing platform.

12. The smoker of claim 11, wherein the communication represents a user-made selection on a remote device.

13. The smoker of claim 10, wherein causing the hopper to feed wood pellets into the combustion area according to the wood-pellet feed rate comprises increasing the wood-pellet feed rate to the combustion area.

14. The smoker of claim 13, wherein causing the hopper to feed wood pellets into the combustion area according to the wood-pellet feed rate comprises increasing the wood-pellet feed rate to the combustion area to cause an overall inefficient burn of the wood pellets within the combustion area.

15. The smoker of claim 10, wherein the received instructions further comprise instructions for a fan of the smoker to provide air flow to the combustion area to achieve the higher level of smoldering.

16. A method of controlling operation of a smoker comprising a combustion area, a hopper for providing wood pellets to the combustion area, and an electronic controller, the method comprising:
  receiving a communication, at the electronic controller and from a cloud computing platform via a direct network connection, comprising instructions that the smoker is to initiate a mode of operation that results in a higher level of smoldering within the combustion area relative to a default mode of operations and that permits the smoker to maintain an internal temperature within a range of temperatures;
  based at least partially on the received instructions, a current internal temperature of the smoker, and the permitted range of temperatures, determining a wood-pellet feed rate to the combustion area to achieve to achieve the higher level of smoldering while maintaining an internal temperature within the permitted range of temperatures; and
  initiating the mode of operation by causing the hopper to feed wood pellets into the combustion area according to the wood-pellet feed rate.

17. The method of claim 16, wherein causing the hopper to feed wood pellets into the combustion area according to the wood-pellet feed rate comprises increasing the wood-pellet feed rate to the combustion area to cause an overall inefficient burn of the wood pellets within the combustion area.

18. The method of claim 16, wherein the communication represents a user-made selection on a remote device.

19. The method of claim 16, further comprising causing a fan of the smoker to provide air flow to the combustion area to cause wood pellets within the combustion area to achieve the higher level of smoldering.

20. The method of claim 16, further comprising:
  continuously determining a current ambient temperature external to the smoker during the mode of operation; and
  automatically adjusting the wood-pellet feed rate to the combustion area according to changes in the determined current ambient temperature during the mode of operation.

* * * * *